(12) United States Patent
Osterman et al.

(10) Patent No.: US 9,316,865 B2
(45) Date of Patent: Apr. 19, 2016

(54) RAPID SWITCHING OPTICAL SHUTTER ALTERNATELY TRANSMITTING VISIBLE RADIATION AND NEAR INFRARED RADIATION

(71) Applicant: LC-TEC Displays AB, Borlänge (SE)

(72) Inventors: Jesper Osterman, Falun (SE); Terry J. Scheffer, Hilo, HI (US)

(73) Assignee: LC-TEC Displays AB, Borlänge (SE)

( * ) Notice: Subject to any disclaimer, the term of this patent is extended or adjusted under 35 U.S.C. 154(b) by 1 day.

(21) Appl. No.: 14/372,956

(22) PCT Filed: Jan. 18, 2013

(86) PCT No.: PCT/US2013/022287
§ 371 (c)(1),
(2) Date: Jul. 17, 2014

(87) PCT Pub. No.: WO2013/109979
PCT Pub. Date: Jul. 25, 2013

(65) Prior Publication Data
US 2014/0347570 A1    Nov. 27, 2014

Related U.S. Application Data

(60) Provisional application No. 61/588,511, filed on Jan. 19, 2012.

(51) Int. Cl.
*G02F 1/13363* (2006.01)
*G02F 1/01* (2006.01)
(Continued)

(52) U.S. Cl.
CPC .......... *G02F 1/13363* (2013.01); *G02F 1/0136* (2013.01); *G02F 1/1333* (2013.01);
(Continued)

(58) Field of Classification Search
CPC .......... G02F 1/13363; G02F 1/133533; G02F 1/133636
USPC ...................................................... 349/2, 119
See application file for complete search history.

(56) References Cited

U.S. PATENT DOCUMENTS 4,635,051 A    1/1987 Bos
4,679,068 A    7/1987 Lillquist et al.
(Continued)

FOREIGN PATENT DOCUMENTS

JP    2006-317645 A    11/2006

OTHER PUBLICATIONS

Seong-Jin Kim, Jungsoon Shin, James D. K. Kim, et al., A Full-HD CMOS Image Sensor with Time-Multiplexed 2D/3D Image Acquisition, *19th International Display Workshop at Asia Display 2012*, Kyoto, Japan, Dec. 3-7, 2012.

(Continued)

*Primary Examiner* — Sang V Nguyen
(74) *Attorney, Agent, or Firm* — Stoel Rives LLP

(57) ABSTRACT

An optical shutter (10) includes a wavelength selective polarizing filter (12) in optical association with a liquid crystal polarization modulator (14) to rapidly switch between optical states to alternately transmit visible radiation and near infrared radiation. The wavelength selective polarizing filter is constructed to impart a polarization state to incident radiation and transmit polarized radiation within at least the visible wavelength region of the electromagnetic spectrum. The liquid crystal polarization modulator is positioned to receive incident radiation for internal propagation through the liquid crystal polarization modulator and is responsive to a first value and a second value of an applied control signal (32) to switch the internally propagating radiation to, respectively, a first polarization state and a second polarization state. The switching between the first and second polarization states produces, in cooperation with the wavelength selective polarizing filter, optical shutter output radiation in different wavelength regions of the electromagnetic spectrum.

10 Claims, 16 Drawing Sheets

(51) Int. Cl.
*G02F 1/1335* (2006.01)
*G02F 1/1333* (2006.01)

(52) U.S. Cl.
CPC .... *G02F1/133533* (2013.01); *G02F 1/133636* (2013.01); *G02F 2203/11* (2013.01); *G02F 2203/58* (2013.01)

(56) References Cited

U.S. PATENT DOCUMENTS

| | | | | |
|---|---|---|---|---|
| 5,208,688 | A | | 5/1993 | Fergason et al. |
| 5,243,455 | A | | 9/1993 | Johnson et al. |
| 5,990,996 | A | * | 11/1999 | Sharp .................. G02F 1/0136 348/E5.133 |
| 6,519,022 | B1 | * | 2/2003 | Xu ........................ G02B 6/272 349/196 |
| 7,001,068 | B2 | * | 2/2006 | Howard ................... G01J 3/45 356/453 |
| 7,391,008 | B2 | | 6/2008 | Fouquet et al. |
| 8,411,146 | B2 | | 4/2013 | Twede |
| 2004/0095523 | A1 | * | 5/2004 | Li ......................... B82Y 15/00 349/86 |
| 2005/0141117 | A1 | * | 6/2005 | Kim ..................... H04N 5/2254 359/892 |
| 2007/0170352 | A1 | * | 7/2007 | Fouquet .................... G01J 3/10 250/214 R |
| 2011/0058038 | A1 | * | 3/2011 | Twede ................... H04N 9/045 348/148 |

OTHER PUBLICATIONS

K. L. Marshall, G. Painter, K. Lotito, et al., Transition Metal Dithiolene Near-IR Dyes and Their Applications in Liquid Crystal Devices, *Mol. Cryst. Liq. Cryst.*, vol. 454, pp. 47/[449]-79/[481], 2006.

V. Chigrinov, et al., Non Polarizer Guest-Host mode based on Dyes with Negative Dichroism, *Japanese Journal of Applied Physics*, Part 1, vol. 42, No. 3, pp. 1297-1300, 2003.

T. Scheffer and J. Nehring, Guest-Host Displays, *The Physics and Chemistry of Liquid Crystal Devices*, G. Sprokel Ed., Plenum Press, N.Y., pp. 173-198, 1979.

U.S. Appl. No. 14/334,517, filed Jul. 17, 2014.

* cited by examiner

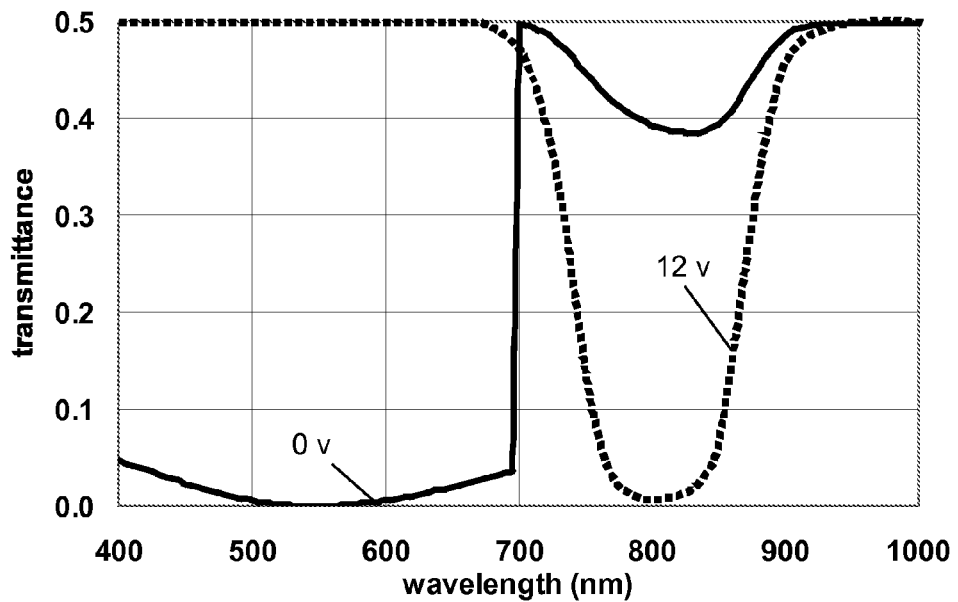
Fig. 5
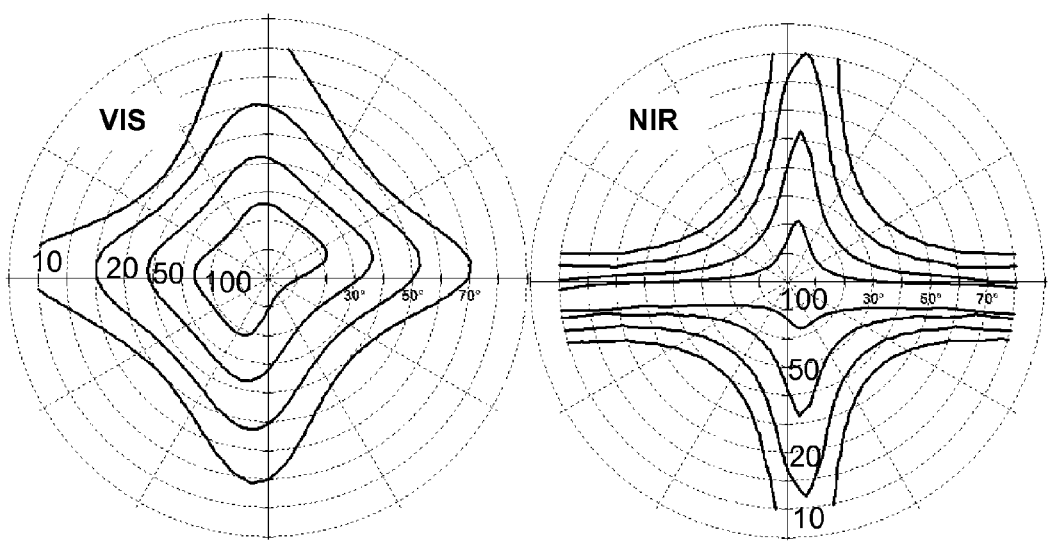
Fig. 6A
Fig. 6B

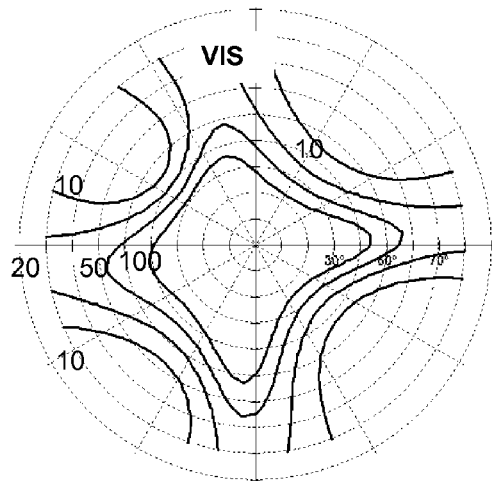
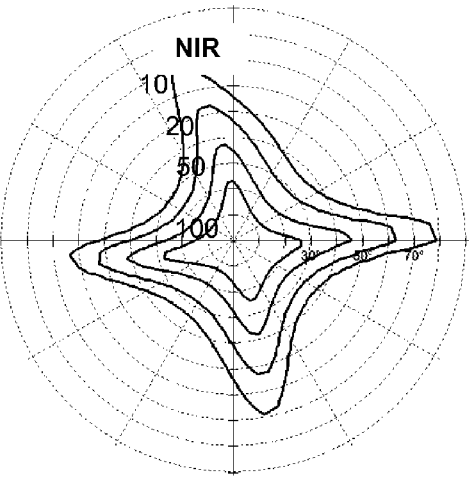
Fig. 21A    Fig. 21B
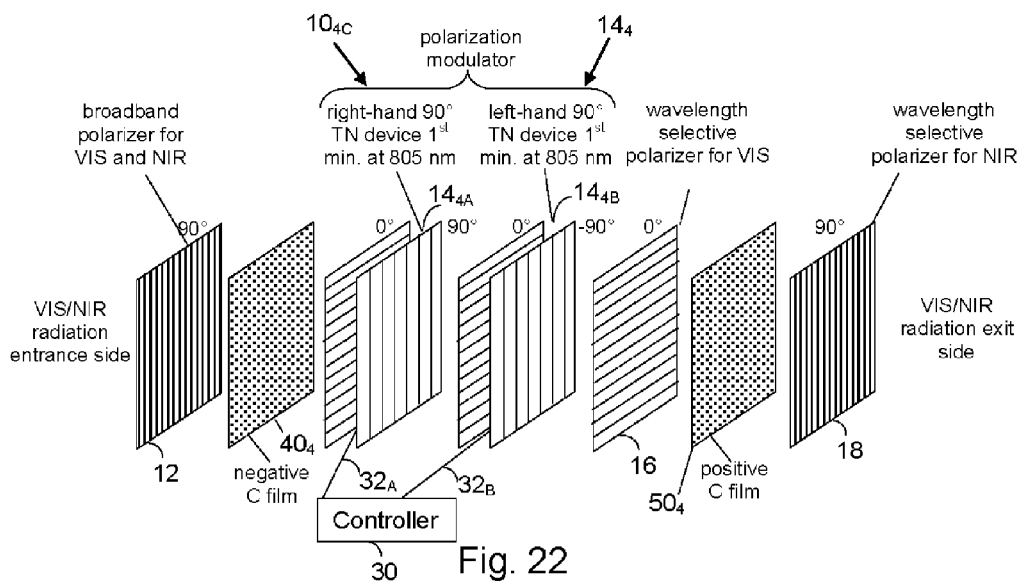
Fig. 22

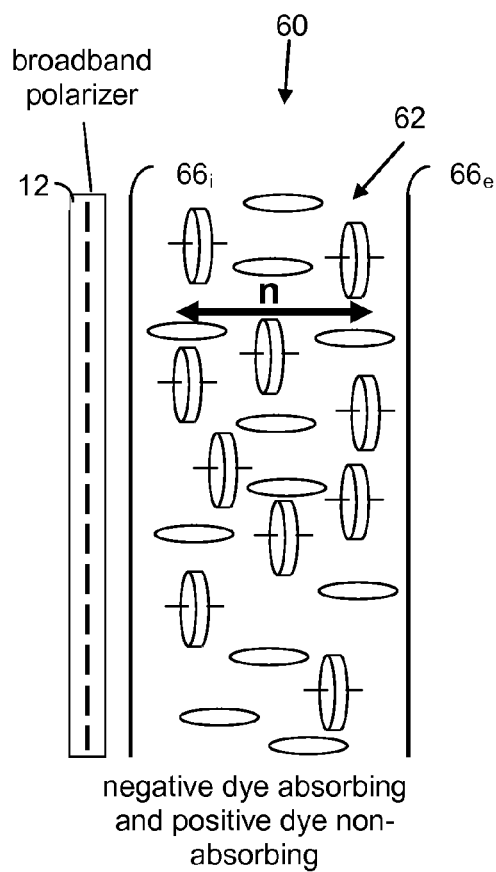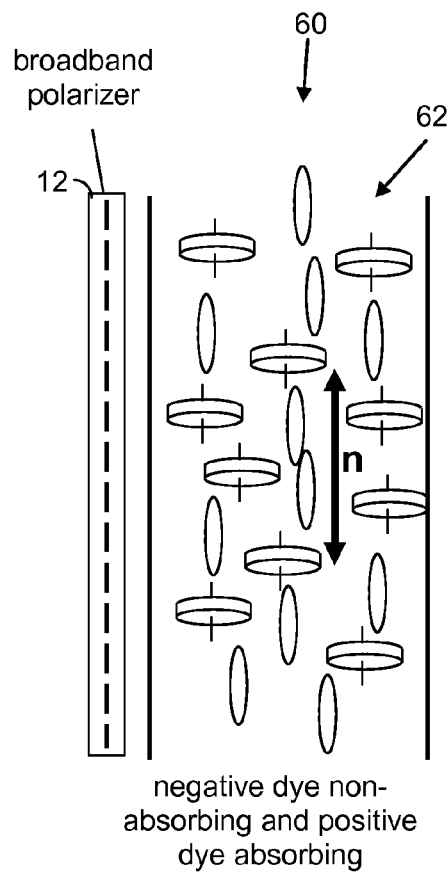
Fig. 24A — negative dye absorbing and positive dye non-absorbing
Fig. 24B — negative dye non-absorbing and positive dye absorbing

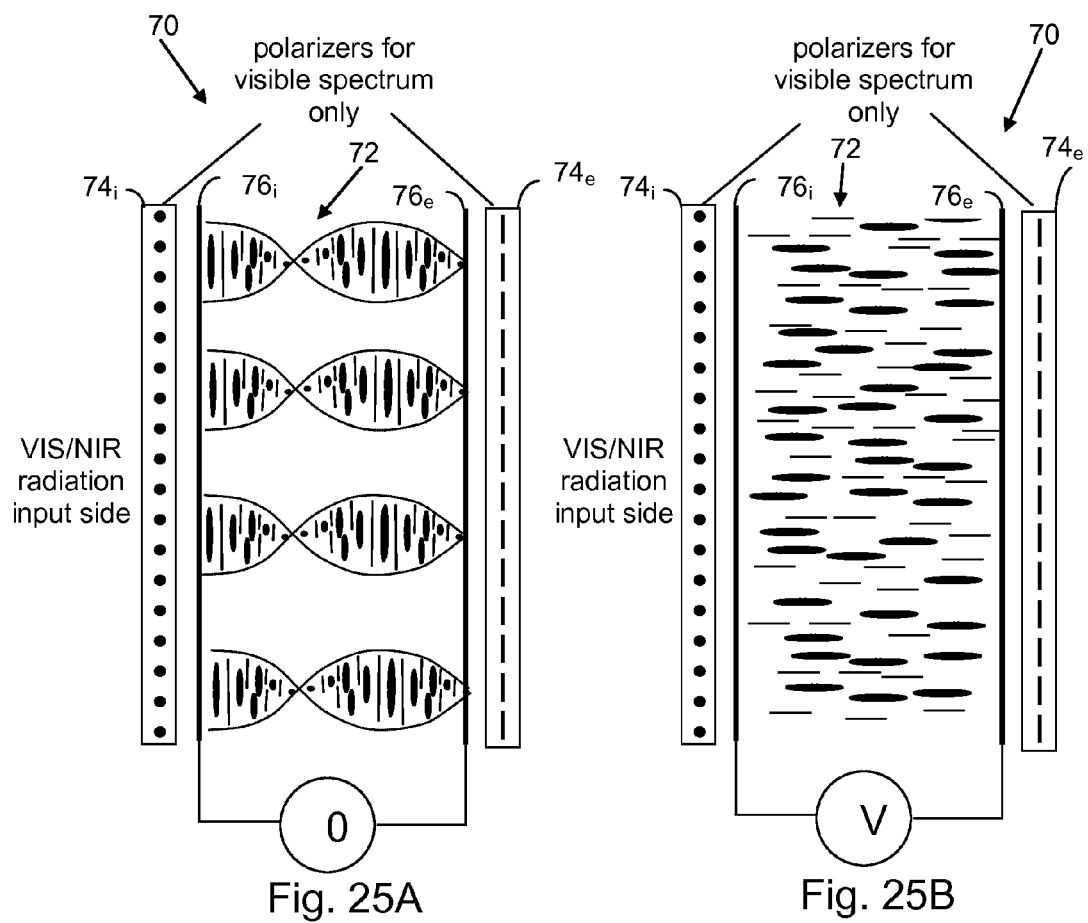

RAPID SWITCHING OPTICAL SHUTTER ALTERNATELY TRANSMITTING VISIBLE RADIATION AND NEAR INFRARED RADIATION

COPYRIGHT NOTICE

©2013 LC-TEC Displays AB. A portion of the disclosure of this patent document contains material that is subject of copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This application relates to optical shutters and, in particular, to an optical shutter that rapidly switches between optical states to alternately transmit incident visible and near infrared radiation.

SUMMARY OF THE DISCLOSURE

An optical shutter includes a wavelength selective polarizing filter in optical association with a liquid crystal polarization modulator to rapidly switch between optical states to alternately transmit visible radiation and near infrared radiation. The wavelength selective polarizing filter is constructed to impart a polarization state to incident radiation and transmit polarized radiation within at least the visible wavelength region of the electromagnetic spectrum.

The liquid crystal polarization modulator is positioned to receive incident radiation for internal propagation through the liquid crystal polarization modulator and is responsive to a first value and a second value of an applied control signal to switch the internally propagating radiation to, respectively, a first polarization state and a second polarization state. The switching between the first and second polarization states produces, in cooperation with the wavelength selective polarizing filter, optical shutter output radiation in different wavelength regions of the electromagnetic spectrum. The switching of the internally propagating radiation to the first polarization state causes transmission and blockage of the optical shutter output radiation within, respectively, the visible wavelength region and the near infrared region. The switching of the internally propagating radiation to the second polarization state causes transmission and blockage of the optical shutter output radiation within, respectively, the near infrared wavelength region and the visible wavelength region.

In a first embodiment, the optical shutter has, in optical series arrangement, a wavelength selective polarizing filter pair that includes a wavelength selective polarizing filter transmitting polarized radiation within the visible wavelength region and a wavelength selective polarizing filter transmitting polarized radiation within the near infrared wavelength region. The wavelength selective polarizing filter that is constructed to impart a polarization state to incident radiation constitutes a broadband wavelength selective polarizing filter that transmits polarized radiation in the visible wavelength region and the near infrared wavelength region. The liquid crystal polarization modulator is positioned between the broadband wavelength selective polarizing filter and the wavelength selective polarizing filter pair.

In a second embodiment of the optical shutter, the wavelength selective polarizing filter that is constructed to impart a polarization state to incident radiation constitutes a broadband wavelength selective polarizing filter that transmits polarized radiation in the visible wavelength region and the near infrared wavelength region. The liquid crystal polarization modulator includes a guest-host liquid crystal mixture that includes a liquid crystal director. The guest-host liquid crystal mixture, depending on an orientation of the liquid crystal director determined by one of the first and second polarization states to which the internally propagating radiation is switched, exhibits variable absorption of different radiation wavelength regions to produce the optical shutter output radiation in different wavelength regions of the electromagnetic spectrum.

In a third embodiment of the optical shutter, the liquid crystal polarization modulator includes a guest-host liquid crystal mixture that includes a liquid crystal director contained between first and second electrodes. The guest-host liquid crystal mixture exhibits variable absorption of different radiation wavelength regions, depending on the orientation of the liquid crystal director relative to the polarization state of the internally propagating radiation. The optical shutter includes first and second wavelength selective polarizing filters imparting a polarization state to incident radiation within the visible wavelength region but not imparting a polarization state to incident radiation within the near infrared wavelength region. The first and second wavelength selective polarizing filters are positioned adjacent different ones of the first and second electrodes of the liquid crystal polarization modulator. The liquid crystal polarization modulator and the first and second wavelength selective polarizing filters cooperate to selectively produce the optical shutter output radiation in the visible wavelength region and the near infrared wavelength region, as determined by one of the first and second polarization states to which the filter output radiation is switched.

Additional aspects and advantages will be apparent from the following detailed description of preferred embodiments, which precedes with reference to the accompanying drawings.

BRIEF DESCRIPTION OF THE DRAWINGS

FIG. 5 shows simulated optical transmission spectra of the VIS/NIR shutter of FIG. 4.

FIGS. 6A and 6B show simulated iso-contrast diagrams of the VIS/NIR shutter of FIG. 4 for, respectively, VIS radiation and NIR radiation at 805 nm.

FIGS. 21A and 21B show simulated iso-contrast diagrams of the VIS/NIR shutter of FIG. 19 for, respectively, VIS radiation and NIR radiation at 805 nm.

FIG. 22 is a diagram of the optical components of a viewing angle-compensated version of the VIS/NIR shutter of FIG. 19.

FIGS. 24A and 24B show a second VIS/NIR optical shutter embodiment, in which a guest-host effect liquid crystal polarization modulator operates with the liquid crystal director in respective first and second orientations to absorb radiation in different radiation wavelength regions and thereby alternately transmit VIS radiation and NIR radiation.

FIGS. 25A and 25B show a third VIS/NIR optical shutter embodiment, in which a guest-host effect liquid crystal polarization modulator comprising a 270° twisted nematic liquid crystal structure operates with the liquid crystal director in, respectively, a twisted orientation to transmit VIS radiation and block NIR radiation and a vertically aligned state to transmit NIR radiation and block VIS radiation.

DETAILED DESCRIPTION OF PREFERRED EMBODIMENTS

The disclosed optical shutter is useful in a digital camera having an image sensor that operates in accordance with a time-multiplexed scheme for alternately capturing color images and depth images. NIR radiation, which is invisible to human eyes and transparent to conventional color filters, functions as an emitter in the performance of time-of-flight measurements that contribute to acquisition of depth data in depth image formation. A 3D image sensor providing high-resolution 2D color maps and high-accuracy 3D depth maps in time-multiplexed manner is described by Seong-Jin Kim, Jungsoon Shin, James D. K. Kim, et al., "A Full-HD CMOS Image Sensor with Time-multiplexed 2D/3D Image Acquisition," 19th International Display Workshop at Asia Display 2012, Kyoto, Japan (Dec. 3-7, 2012).

Figure 1A:
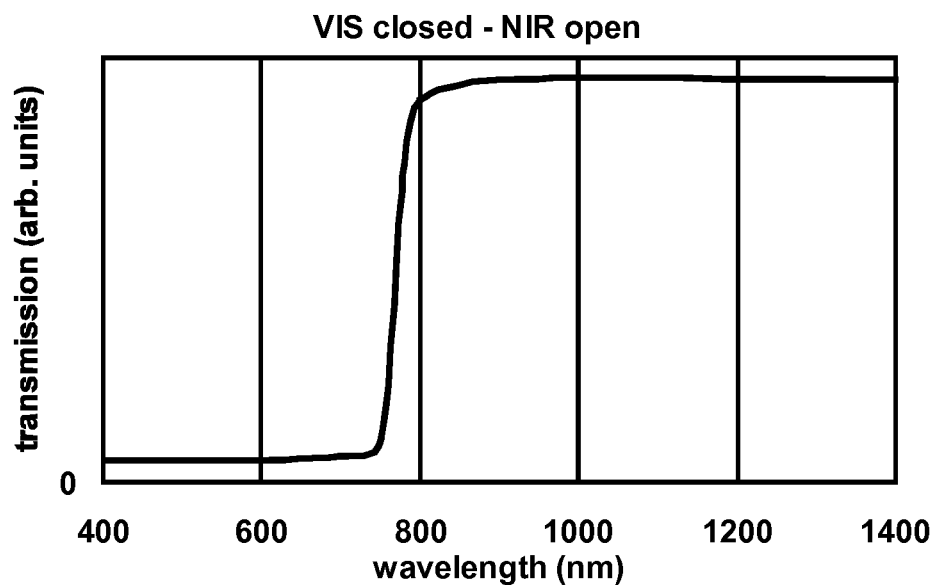
FIGS. 1A and 1B show simulated optical transmission spectra of a first VIS/NIR optical shutter embodiment in, respectively, a visible (VIS) radiation blocking and near infrared (NIR) radiation transmitting optical shutter output state and a visible (VIS) radiation transmitting and near infrared (NIR) radiation blocking optical shutter output state.
Figure 1B:
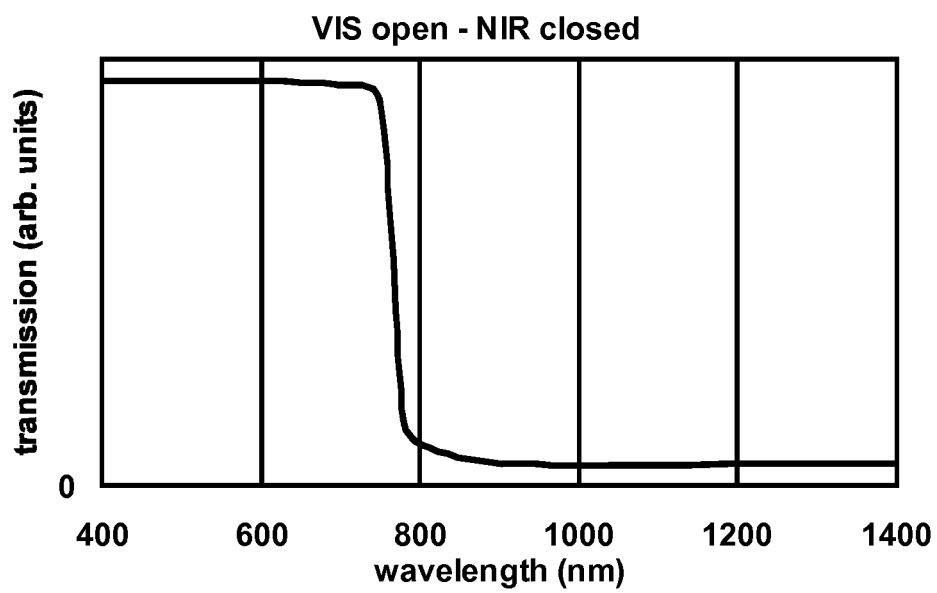

The following disclosure describes multiple embodiments of a liquid crystal optical shutter that alternately transmits visible (VIS) radiation while blocking near infrared (NIR) radiation and then blocks VIS radiation while transmitting NIR radiation. The operation of the shutter is schematically illustrated in FIGS. 1A and 1B. The wavelengths of VIS radiation extend from about 380 nm to about 780 nm, and the wavelengths of NIR radiation extend from about 780 nm to about 1400 nm. During a first time interval, shown in FIG. 1A, the shutter is closed to block VIS radiation but open to transmit NIR radiation. During a second time interval, shown in FIG. 1B, the shutter is open to transmit VIS radiation but closed to block NIR radiation. For some applications, the disclosed liquid crystal shutter may cover only certain wavelength bands within the VIS and NIR wavelength regions rather than cover the entire VIS and NIR wavelength regions.

The disclosed liquid crystal shutter provides a high radiation energy throughput of the corresponding VIS and NIR wavelength bands when selected for transmission; high contrast ratio in the transmitting and blocking of radiation of respective VIS and NIR wavelength bands; rapid switching response between a first time interval when VIS radiation is blocked and NIR radiation is transmitted and a second time interval when VIS radiation is transmitted and NIR radiation is blocked; and a clear, non-scattering aperture suitable for conveying images.

First Embodiment

Figure 2:
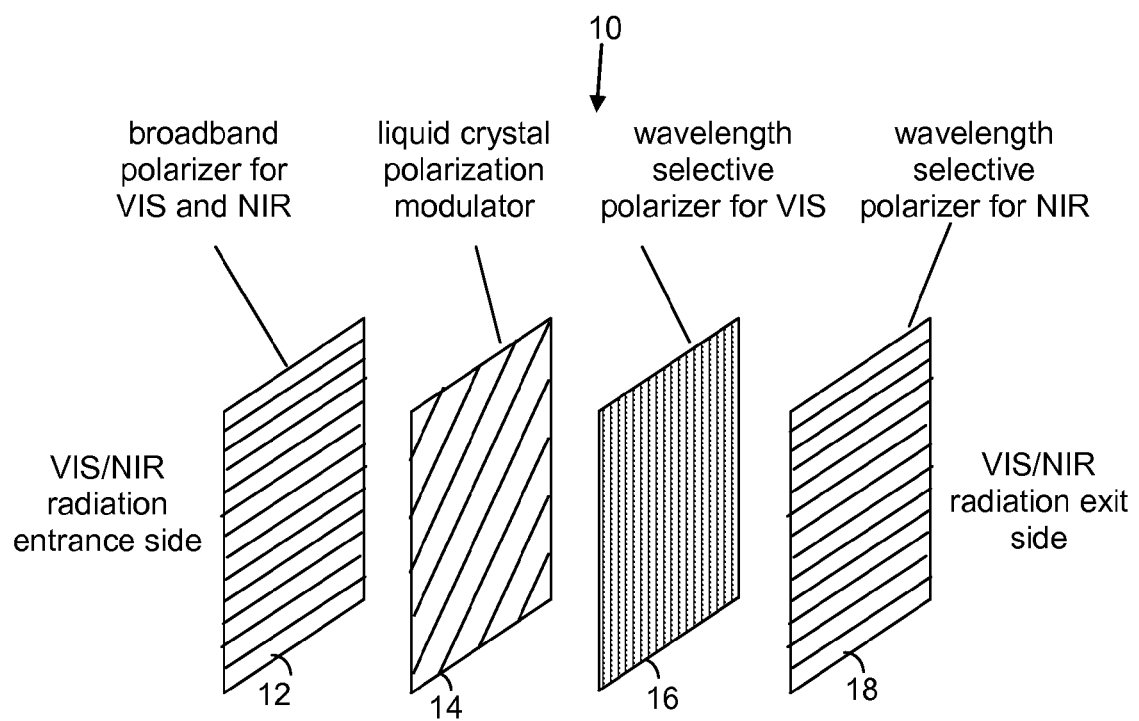
FIG. 2 is a diagram of the optical components of the first VIS/NIR optical shutter embodiment, the optical shutter output states of which are shown in FIGS. 1A and 1B.

A first VIS/NIR shutter embodiment 10 is illustrated in FIG. 2 and comprises a wavelength selective polarizer 12 for VIS and NIR radiation, also referred to as a broadband polarizer, a liquid crystal polarization modulator 14, and a wavelength selective polarizing filter pair including a wavelength selective polarizer 16 for VIS radiation and a wavelength selective polarizer 18 for NIR radiation. VIS and NIR radiation is incident on broadband polarizer 12 and enters the optical component stack of VIS/NIR shutter 10 from the left. The VIS and NIR radiation becomes linearly polarized in the horizontal direction after passing through broadband polarizer 12. (The lines shown on polarizers 12, 16, and 18 in FIG. 2 indicate the E-vector direction of the transmitted radiation.) The horizontally polarized radiation then passes through polarization modulator 14, which either rotates by 90° or leaves unchanged the polarization direction of the VIS and NIR radiation, depending upon the voltage applied to polarization modulator 14.

For the case in which polarization modulator 14 leaves the polarization direction unchanged, wavelength selective VIS polarizer 16 blocks the VIS radiation because its horizontal polarization direction is orthogonally aligned with the vertical transmission axis of wavelength selective VIS polarizer 16. The remaining NIR radiation passes through wavelength selective VIS polarizer 16 and through wavelength selective NIR polarizer 18 because its horizontal polarization direction is parallel to the horizontal transmission axis of wavelength selective NIR polarizer 18.

For the case in which polarization modulator 14 rotates by 90° the polarization direction of incident radiation, wavelength selective VIS polarizer 16 passes the VIS radiation because its vertical transmission direction is now parallel to the vertical transmission axis of wavelength selective VIS polarizer 16. The NIR radiation that passes through wavelength selective VIS polarizer 16 is, however, blocked by wavelength selective NIR polarizer 18 because its horizontal polarization axis is orthogonally aligned with the vertical transmission axis of the NIR radiation.

Wavelength selective polarizer 12 for the VIS and NIR radiation, could be, for example, a wire-grid type polarizer such as the UBB01A polarizer made by Moxtek Inc., Orem, Utah, USA or an iodine type polarizer with added dichroic dyestuff that absorbs in the NIR wavelength region or a dyestuff-type polarizer containing a series of dichroic dyes whose ranges of absorption wavelengths overlap throughout the VIS and NIR wavelength regions. Wavelength selective VIS polarizer 16 could be an iodine-type polarizer, or a dichroic-type polarizer containing a mixture of red, green, and blue absorbing dyes. Wavelength selective NIR polarizer 18 could contain one or more dichroic dyes that absorb radiation in the NIR wavelength region. Dyestuff-type polarizing films are generally made by stretching a polymer film, such as polyvinyl alcohol, in an aqueous solution of dichroic dyes, allowing the dyed film to dry in the stretched condition, and then laminating it between two protective films of tri-acetate cellulose.

Figure 3:
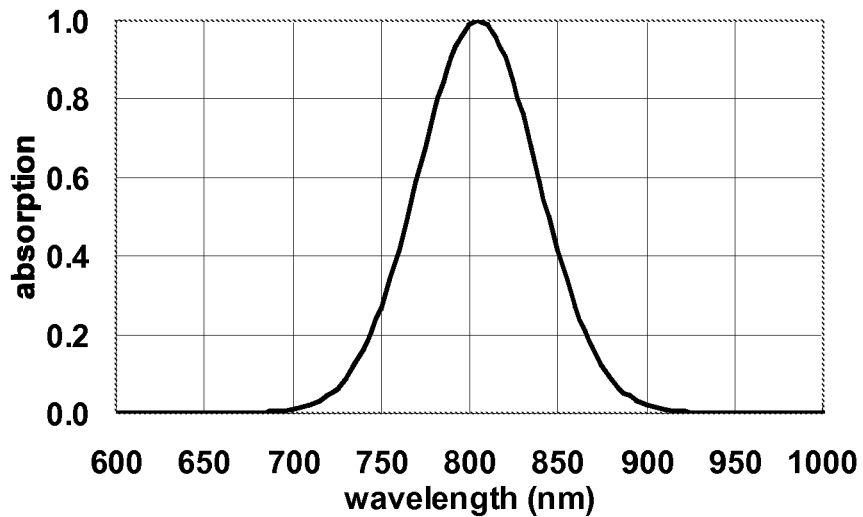
FIG. 3 is a normalized absorption curve of the wavelength selective NIR polarizer shown in FIG. 2.

For the simulations presented in this disclosure, wavelength selective NIR polarizer 18 is approximated by an anisotropically absorbing film having a Gaussian absorption lineshape peaking at 805 nm with a full width at half height of 80 nm and a dichroic ratio of 100. A normalized absorption curve of this film is illustrated in FIG. 3. The dichroic ratio of a film at a particular wavelength is the ratio of the absorbances of the film measured in polarized light with the polarization axis parallel to the direction of maximum absorbance divided by the absorbance measured in light linearly polarized in a direction perpendicular to the direction of maximum absorbance. In FIG. 2, wavelength selective VIS polarizer 16 is assumed to be an ideal polarizer for wavelengths up to 700 nm, beyond which there is no absorption, and broadband VIS/NIR polarizer 12 is assumed to be an ideal polarizer for wavelengths up to 1000 nm.

Polarization modulator 14 selectively does not rotate or rotates by 90° the polarization direction of incident light, depending upon the applied voltage. Suitable candidates for liquid crystal polarization modulators for the disclosed liquid crystal shutter implementations include an ECB type liquid crystal device with a homogeneously aligned liquid crystal material having a positive dielectric anisotropy, a VAN type liquid crystal device with a homeotropically aligned liquid crystal material having a negative dielectric anisotropy, a pi-cell liquid crystal device, a ferroelectric liquid crystal device, and a twisted nematic (TN) liquid crystal device.

Figure 4:
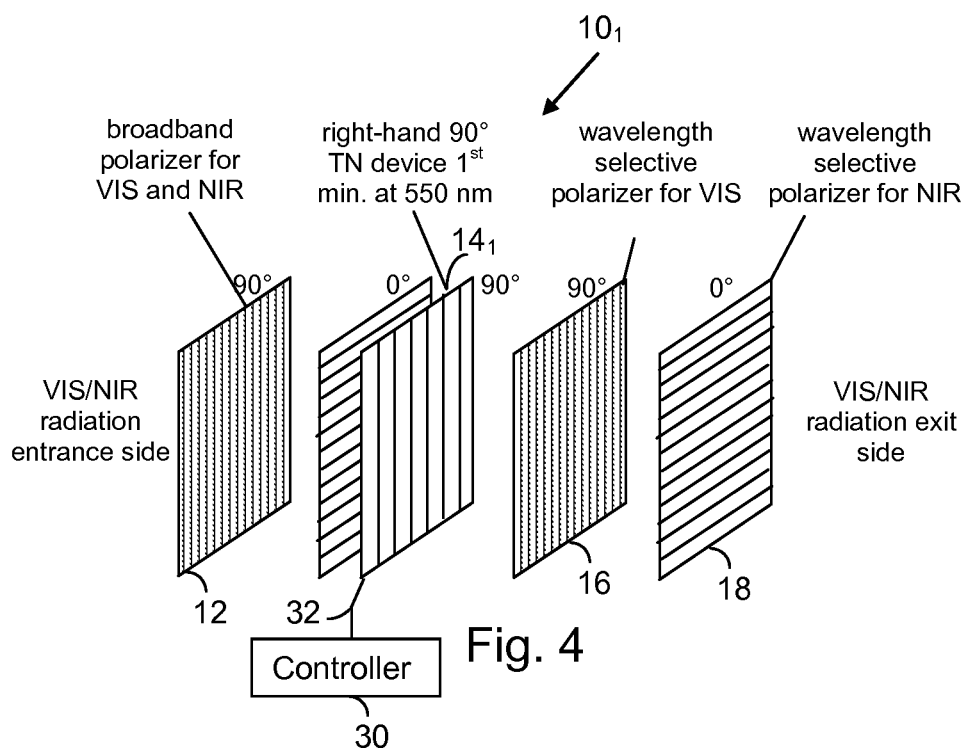
FIG. 4 is a diagram of the optical components of a VIS/NIR shutter that includes a twisted nematic (TN) liquid crystal polarization modulator tuned to a 550 nm design wavelength.

FIG. 4 is a diagram of the optical components of a VIS/NIR shutter $10_1$, in which the polarization modulator is a right-handed 90° TN device $14_1$ that operates in the so-called first minimum mode at a design wavelength of 550 nm, where the human eye is most sensitive. In this mode, the birefringence, $\Delta n$, of the liquid crystal material and the cell gap, d, of TN device $14_1$ are chosen to satisfy the first minimum criteria: $\Delta n \cdot d/\lambda = \frac{1}{2}\sqrt{3}$, where $\lambda$ is the design wavelength. For example, a liquid crystal material with a birefringence of 0.225 requires a 2.12 µm-cell gap to satisfy the first minimum condition at 550 nm. In the first minimum mode, the polarization direction of radiation propagating through the output side of TN device $14_1$ when no voltage is applied is linearly polarized and is perpendicular to the linear polarization direction of radiation propagating through the input side of TN device $14_1$. The transmission spectra of VIS/NIR shutter $10_1$ tuned for 550 nm are shown in FIG. 5. With reference to FIG. 4, when a controller 30 applies a 0 V signal 32 to set TN device $14_1$ to its OFF state, TN device $14_1$ rotates by 90° the 90°-input polarization direction of radiation incident on TN device $14_1$ at 550 nm so that light polarized at 0° exits TN device $14_1$. This 0° polarization direction is perpendicular to the 90° transmission axis of wavelength selective VIS polarizer 16, and the transmittance is essentially zero at the design wavelength of 550 nm. At visible radiation (hereafter "VIS light") wavelengths other than 550 nm, elliptically polarized light exits TN device $14_1$, so that a certain amount of VIS light leaks through wavelength selective VIS polarizer 16. This light leakage results in an overall transmitted luminance of 0.444%, taking into account the spectral response of the human eye. In the NIR wavelength region of the spectrum, the light is also elliptically polarized so that a certain amount of NIR radiation is absorbed by wavelength selective NIR polarizer 18. The transmittance at 805 nm is 39.1%. The transmission curve for the case of TN device $14_1$ in its OFF state at 0 V is shown by the solid curve in FIG. 5.

When controller 30 applies a 12 V signal 32 to set TN device $14_1$ to its ON state, TN device $14_1$ imparts no rotation of the polarization direction of radiation incident on TN device $14_1$ so that radiation remaining linearly polarized at 90° exits TN device $14_1$. This 90° polarization direction is parallel to the 90° transmission axis of wavelength selective VIS polarizer 16, and the VIS light passes through it without absorption. The result is a 50% transmitted luminance and a contrast ratio of 112.6 over the visible spectrum. In the NIR wavelength region of the spectrum, the light is also linearly polarized at 90°, but this polarization direction is perpendicular to the 0° transmission axis of wavelength selective NIR polarizer 18, leading to maximum absorption and NIR radiation transmittance at 805 nm of 0.338%, and thereby resulting in a contrast ratio of 115.6 at 805 nm. The transmission curve for the case of TN device $14_1$ in its ON state at 12.0 V is shown by the dotted curve in FIG. 5.

The dependence of contrast ratio on the angle of incident light on VIS/NIR shutter $10_1$ of FIG. 4 is illustrated by the iso-contrast diagrams for VIS light in FIG. 6A and for NIR radiation at 805 nm in FIG. 6B. These diagrams are contour plots of the contrast ratio for light rays transmitted at polar angles extending from 0° to 80° and azimuthal angles from 0° to 360°. Contrast ratio contours of 100, 50, 20, and 10 are indicated on the diagrams. It is known that the contrast ratio of an optical shutter is primarily determined by its dark state. The viewing angles for high-contrast viewing in the VIS wavelength region (FIG. 6A) are relatively wide because for this case the dark state is determined by TN device $14_1$ in its normally black (NB) mode between parallel aligned polarizers, which is known to have a wide range of high-contrast viewing angles. Compared with those of the VIS wavelength region, the viewing angles in the NIR wavelength region of the spectrum (FIG. 6B) are relatively narrow. In the NIR wavelength region, TN device $14_1$ operates in its normally white mode (NW) between perpendicularly aligned polarizers, which is known to have narrow range of high-contrast viewing angles. When it is set to the ON state, TN device $14_1$ has the optical properties akin to those of a positive C film. It is known that the viewing angles for a NW TN device can be improved with use of an external negative C film or a commercially available Wide View (WV) compensator film from Fujifilm Corp., Japan.

Figure 7:
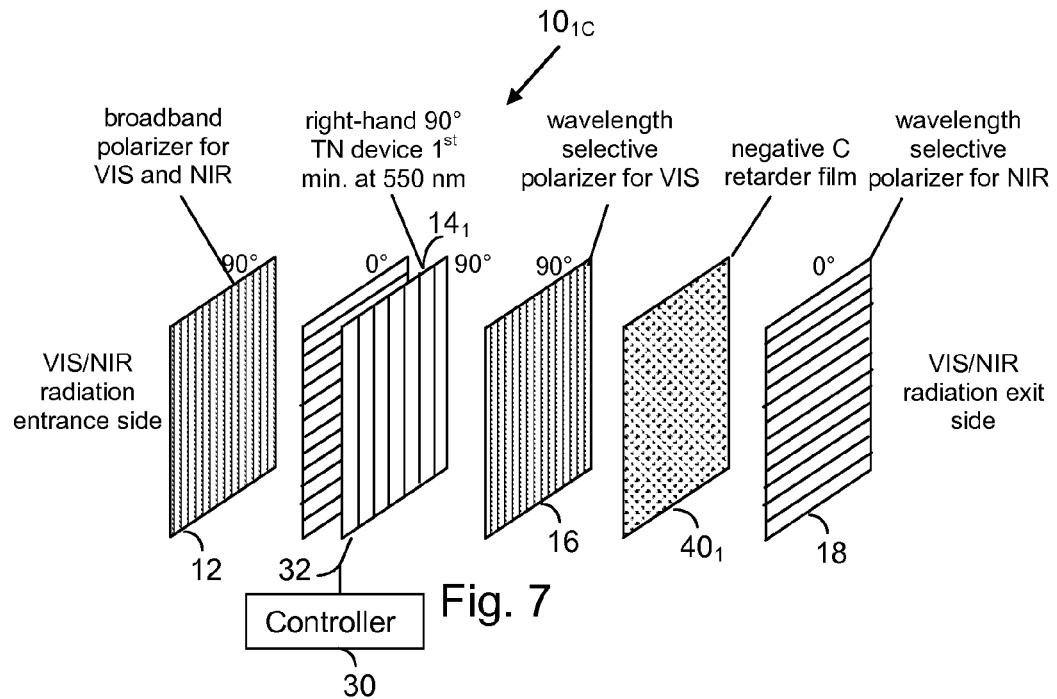
FIG. 7 is a diagram of the optical components of a viewing angle-compensated version of the VIS/NIR shutter of FIG. 4.
Figure 8:
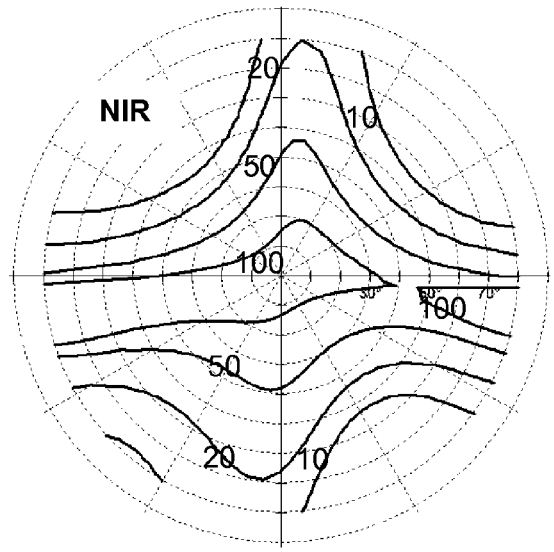
FIG. 8 shows a simulated iso-contrast diagram of the viewing angle-compensated VIS/NIR shutter of FIG. 7 for NIR radiation at 805 nm.

FIG. 7 shows a VIS/NIR shutter $10_{1C}$, which differs from VIS/NIR shutter $10_1$, in that a negative C retarder film $40_1$ is positioned between wavelength selective VIS polarizer 16 and wavelength selective NIR polarizer 18 for viewing angle compensation. The placement of negative C retarder film 40₁ allows it to improve the viewing angles in the NIR wavelength region without affecting the already wide viewing angles in the VIS wavelength region. FIG. 8 shows an iso-contrast diagram in the NIR wavelength region at 805 nm for the case in which negative C retarder film 40₁ has a retardation of 300 nm. A comparison of FIG. 8 with FIG. 6B shows that negative C retarder film 40₁ markedly improves the range of high-contrast viewing angles at 805 nm. The iso-contrast diagram for VIS light is unaffected by negative C retarder film 40₁.

Figure 9:
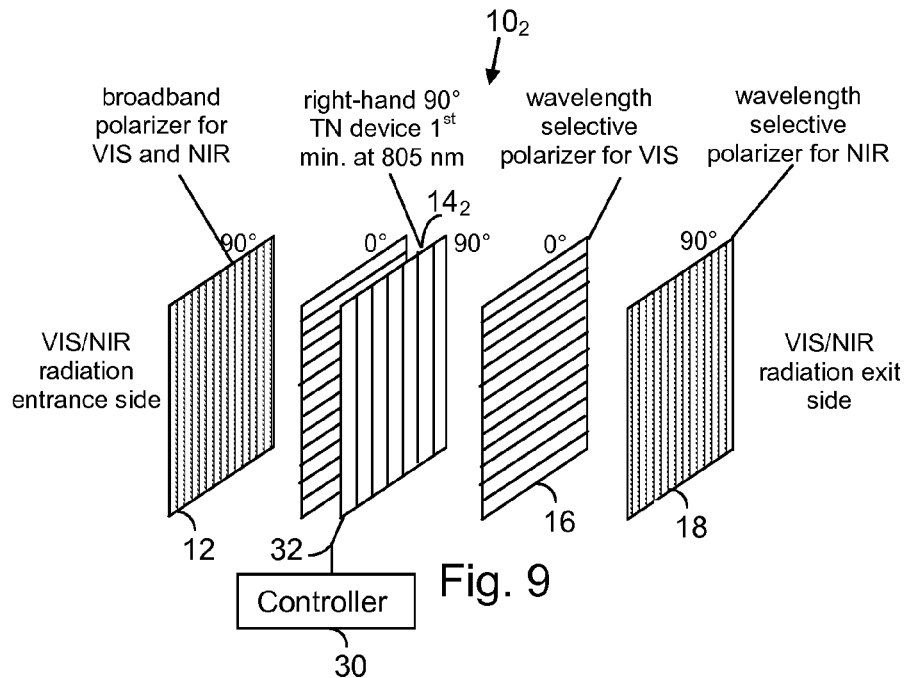
FIG. 9 is a diagram of the optical components of a VIS/NIR shutter that includes a twisted nematic (TN) liquid crystal polarization modulator tuned to an 805 nm design wavelength.

FIG. 9 is a diagram of the optical components of a VIS/NIR shutter 10₂, in which the cell gap and birefringence of a TN device 14₂ are tuned for the first minimum condition at a design wavelength of 805 nm in the NIR wavelength region. Wavelength selective VIS polarizer 16 and NIR polarizer 18 are rotated by 90° from their polarization axis orientations of VIS/NIR shutter 10₁ of FIG. 4. A first minimum at 805 nm corresponds to a 3.10 μm-cell gap for a liquid crystal material with a birefringence of 0.225.

Figure 10:
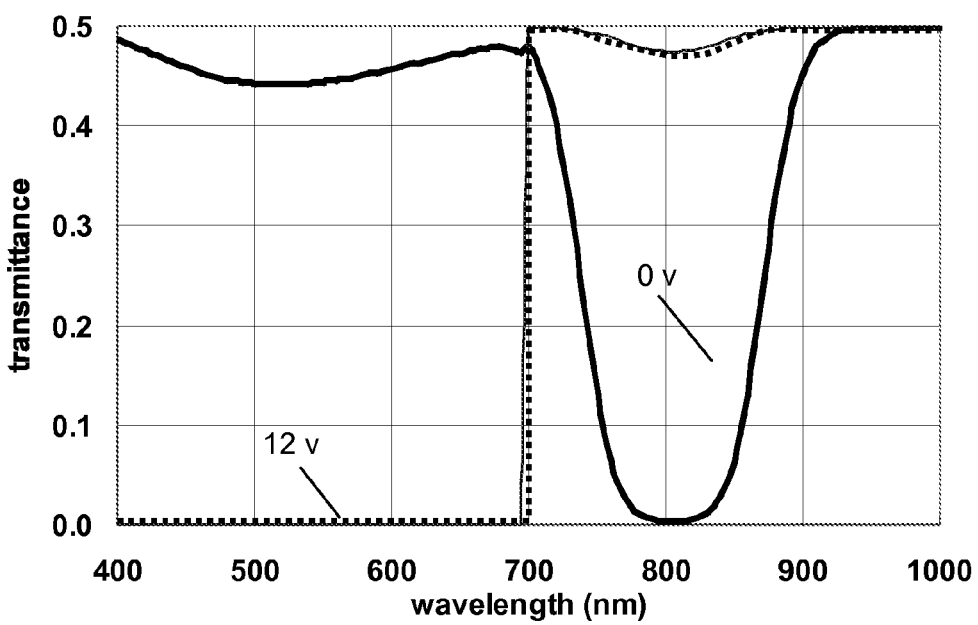
FIG. 10 shows simulated optical transmission spectra of the VIS/NIR shutter of FIG. 9.

The transmission spectra of VIS/NIR shutter 10₂ tuned for 805 nm are shown in FIG. 10. With reference to FIG. 9, when controller 30 applies a 0 V signal 32 to set TN device 14₂ to its OFF state, TN device 14₂ rotates 90° the 90°-input polarization direction of radiation incident on TN device 14₂ at 805 nm so that radiation polarized at 0° exits TN device 14₂. This 0° polarization direction is perpendicular to the 90° transmission axis of wavelength selective NIR polarizer 18, and the transmittance is 0.339% at the design wavelength of 805 nm. In the VIS wavelength region of the spectrum, elliptically polarized light exits TN device 14₂, so that a certain amount of VIS light is absorbed by wavelength selective VIS polarizer 16, reducing the transmitted luminance to 44.9%. The transmission curve for the case of TN device 14₂ in its OFF state at 0 V is shown by the solid curve in FIG. 10. When controller 30 applies a 12 V signal 32 to set TN device 14₂ to its ON state, TN device 14₂ imparts no rotation of the polarization direction of radiation incident on TN device 14₂ so that radiation remaining linearly polarized at 90° exits TN device 14₂. This 90° polarization direction is perpendicular to the 0° transmission axis of wavelength selective VIS polarizer 16, and the VIS light is totally extinguished for all VIS wavelengths. This VIS light extinction results in a theoretically infinite contrast ratio over the visible spectrum. In the NIR wavelength region of the spectrum, the light is also linearly polarized at 90°, but this polarization direction is parallel to the 90° transmission axis of wavelength selective NIR polarizer 18, leading to minimum absorption and NIR radiation transmittance at 805 nm of 47.4%, and thereby resulting in a contrast ratio of 139.8. The transmission curve for the case of TN device 14₂ in its ON state at 12 V is shown by the dotted curve in FIG. 10.

The performance of VIS/NIR shutters 10₁ and 10₂, in which TN devices 14₁ and 14₂ are tuned for 550 nm and 805 nm, respectively, is demonstrated in Table 1 below, where the brightness and contrast ratios in the VIS and NIR wavelength regions can be readily compared.

TABLE 1

| first minimum wavelength | 550 nm | 805 nm |
| --- | --- | --- |
| cell gap | 2.12 μm | 3.10 μm |
| Δn of LC | 0.225 | 0.225 |
| luminance in VIS bright* | 50.0% | 44.9% |
| luminance in VIS dark* | 0.444% | 0.0% |
| contrast in VIS | 112.6 | ∞ |
| transmission at 805 nm bright* | 39.1% | 47.4% |
| transmission at 805 nm dark* | 0.338% | 0.336% |
| contrast at 805 nm | 115.6 | 139.8 |

*for unpolarized input light

Figures 11A, 11B:
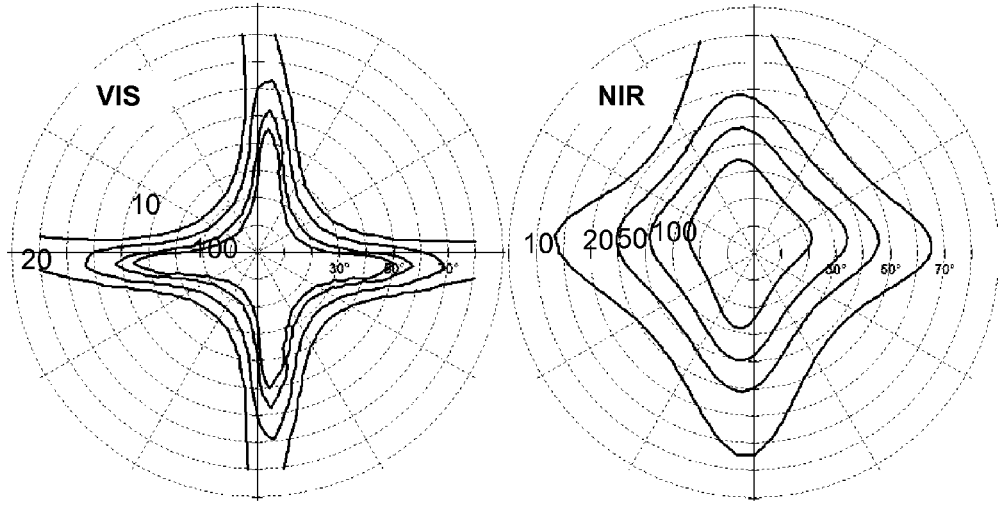
FIGS. 11A and 11B show simulated iso-contrast diagrams of the VIS/NIR shutter of FIG. 9 for, respectively, VIS radiation and NIR radiation at 805 nm.

The dependence of contrast ratio on the angle of incident light on VIS/NIR shutter 10₂ of FIG. 9 is illustrated by the iso-contrast diagrams for VIS light in FIG. 11A and for NIR radiation at 805 nm in FIG. 11B. The viewing angles for high-contrast viewing in the NIR wavelength region (FIG. 11B) are relatively wide because for this case the dark state is determined by TN device 14₂ in its normally black (NB) mode between parallel aligned polarizers. Compared with those of the NIR wavelength region, the viewing angles in the VIS wavelength region of the spectrum (FIG. 11A) are narrower because TN device 14₂ operates in the normally white mode (NW) in which the dark state acts as a positive C retarder film. The viewing angles for a NW TN device can be improved with an external negative C retarder film or a WV compensator film.

Figure 12:
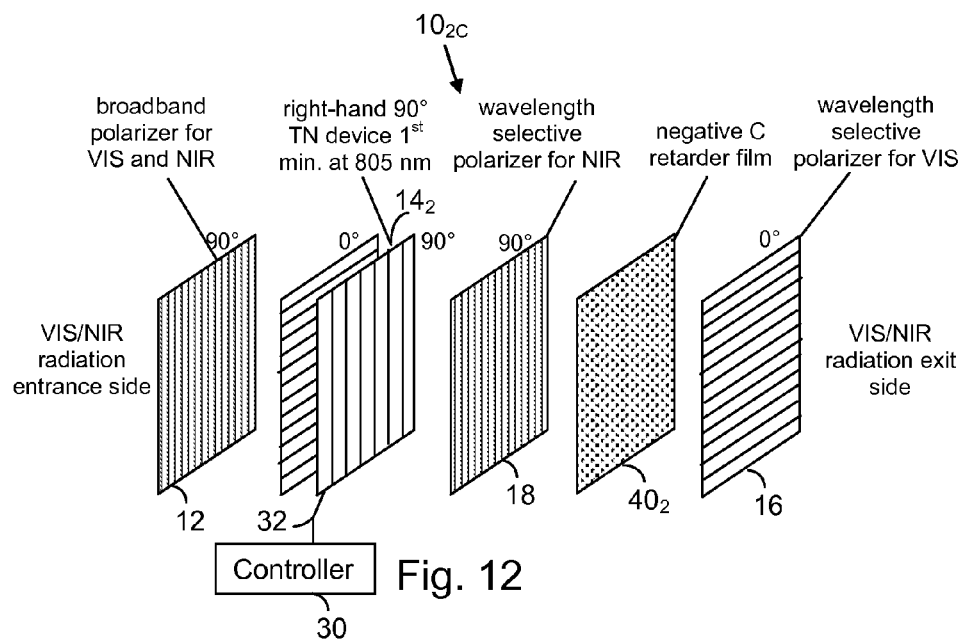
FIG. 12 is a diagram of the optical components of a viewing angle-compensated version of the VIS/NIR shutter of FIG. 9.
Figure 13:
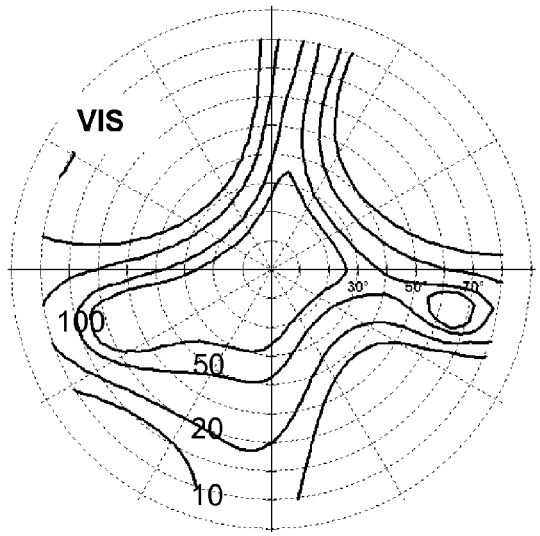
FIG. 13 shows a simulated iso-contrast diagram of the viewing angle-compensated VIS/NIR shutter of FIG. 12 for VIS radiation.

FIG. 12 shows a VIS/NIR shutter 10₂_C_, which differs from VIS/NIR shutter 10₂ in that negative C retarder film 40₂ is positioned between wavelength selective NIR polarizer 18 and wavelength selective VIS polarizer 16 for viewing angle compensation. FIG. 12 shows that the locations of wavelength selective VIS polarizer 16 and NIR polarizer 18 are interchanged, but not the orientations of their polarization axes. The placement of negative C retarder film 40₂ allows it to improve the viewing angles in the VIS wavelength region without affecting the already wide viewing angles of the NIR wavelength region. FIG. 13 shows an iso-contrast diagram in the VIS wavelength region for the case in which negative C retarder film 40₂ has a retardation of 500 nm. A comparison of FIG. 13 with FIG. 11A shows that negative C retarder film 40₂ markedly improves the range of high-contrast viewing angles in the VIS wavelength region. The iso-contrast diagram for NIR radiation is unaffected by negative C retarder film 40₂.

Faster switching speeds can be achieved with use of a polarization modulator constructed with two liquid crystal devices arranged in optical series, such as those disclosed in U.S. Pat. No. 8,023,052 ('052 patent). As described in the '052 patent, during a first subframe, the two liquid crystal devices compensate and the light leaving the polarization modulator is linearly polarized in the same direction as that of the linearly polarized light entering polarization modulator; and during a second subframe, the polarization modulator rotates by 90° the polarization direction of incident input light.

Figure 14:
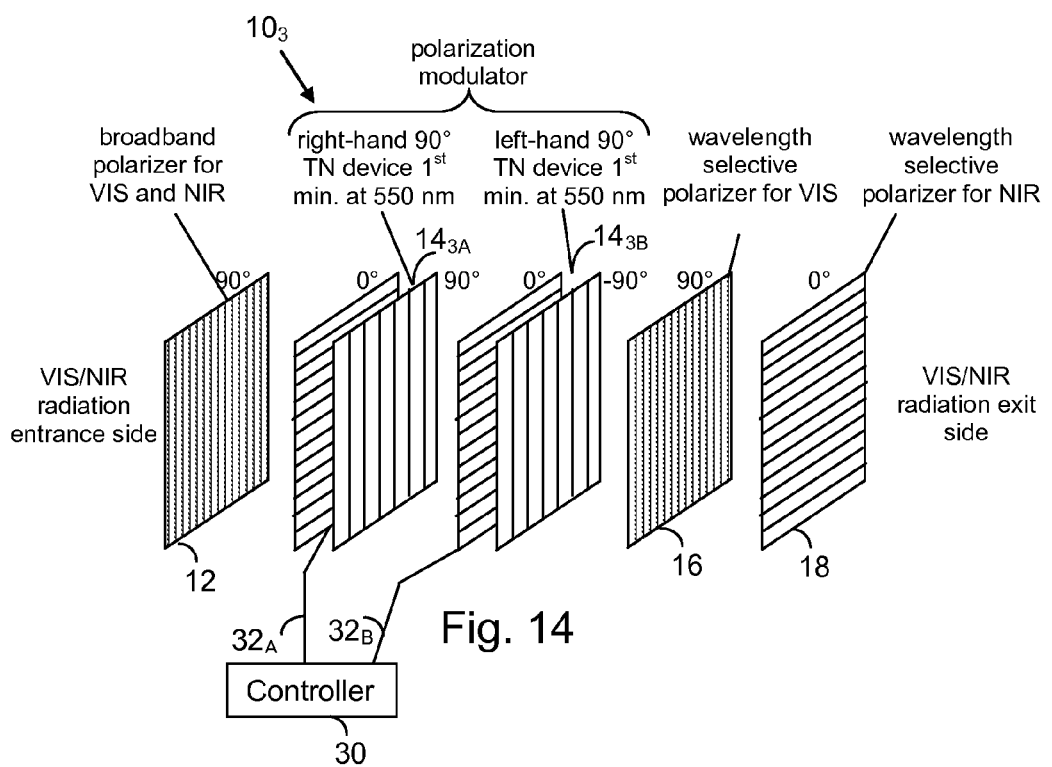
FIG. 14 is a diagram of the optical components of a VIS/NIR shutter in which a polarization modulator includes two TN liquid crystal devices each of which is tuned to a 550 nm design wavelength.
Figure 15:
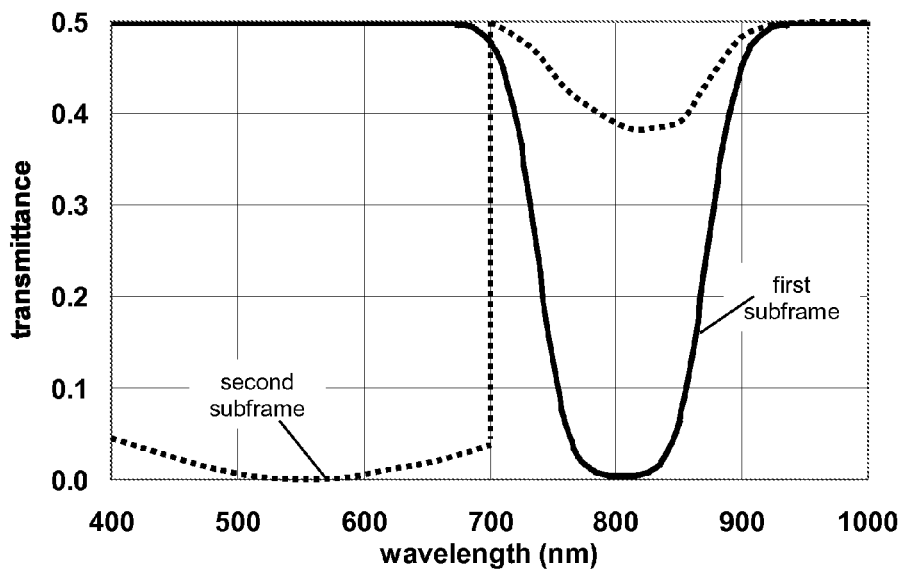
FIG. 15 shows simulated optical transmission spectra of the VIS/NIR shutter of FIG. 14.

FIG. 14 is a diagram of the optical components of a VIS/NIR shutter 10₃, in which a polarization modulator 14₃ comprises two TN devices 14₃_A_ and 14₃_B_. First TN device 14₃_A_ has a right-handed 90° twist, and second TN device 14₃_B_ has a left-handed 90° twist. TN devices 14₃_A_ and 14₃_B_ are placed together such that the surface alignment rubbing directions at the radiation input surfaces of TN devices 14₃_A_ and 14₃_B_ are parallel to each other. The birefringence, Δn, of the liquid crystal material and the cell gap, d, of TN devices 14₃_A_ and 14₃_B_ are chosen such that they operate in the first minimum mode at a design wavelength of 550 nm. With reference to FIG. 14, during the first subframe, when TN devices 14₃_A_ and 14₃_B_ compensate, the transmission axes of broadband polarizer 12 and wavelength selective VIS polarizer 16 are parallel to each other. There is no absorption of VIS light and maximum absorption of NIR radiation because the transmission axes of broadband polarizer 12 and wavelength selective NIR polarizer 18 are perpendicular to each other. The transmission curve for this case is shown by the solid curve in FIG. 15. For unpolarized incident light, the transmittance is 50% over the visible spectrum, and the transmittance at 805 nm is 0.336%. During a second subframe, when controller 30 applies a 12 V signal $32_A$ to set first TN device $14_{3A}$ to its ON state, and controller 30 applies a 0 V signal $32_B$ to set second TN device $14_{3B}$ to its OFF state, the transmission curve for this case is shown by the dotted curve in FIG. 15. In the visible spectrum, the VIS light transmission is zero at 550 nm, the wavelength in which the first minimum condition is precisely met, but then increases for wavelengths of VIS light somewhat above and below 550 nm. The result is an overall transmitted luminance of 0.402% with a transmittance of 39.1% in the NIR wavelength region at 805 nm. The luminous contrast in the VIS wavelength region is 124.4, and the contrast at 805 nm is 116.3.

Figures 16A, 16B:
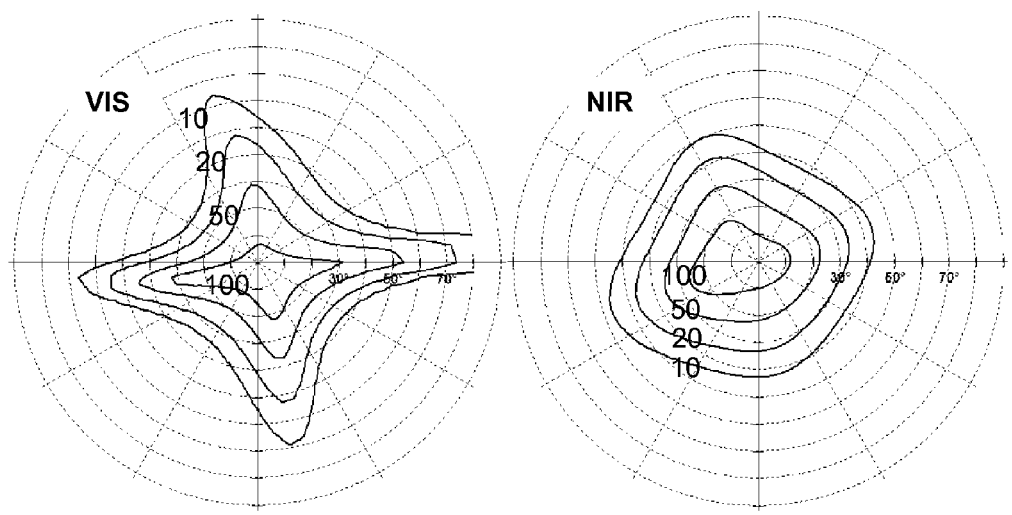
FIGS. 16A and 16B show simulated iso-contrast diagrams of the VIS/NIR shutter of FIG. 14 for, respectively, VIS radiation and NIR radiation at 550 nm.

The dependence of contrast ratio on the angle of incident light on VIS/NIR shutter $10_3$ of FIG. 14 is illustrated by the iso-contrast diagrams for VIS light in FIG. 16A and for NIR radiation at 805 nm in FIG. 16B. Neither of FIG. 16A and FIG. 16B exhibits particularly wide high-contrast viewing angles. In FIG. 16A, the contrast ratio is the ratio of the transmitted luminance in the visible region of the light exiting VIS/NIR shutter $10_3$ during the first subframe (bright state) divided by the transmitted luminance exiting VIS/NIR shutter $10_3$ during the second subframe (dark state). Because the contrast ratio is primarily determined by the dark state when first TN device $14_{3A}$ is in its ON state, modulator $14_3$ has some optical characteristics of a positive C retarder film. In FIG. 16B, the contrast ratio is the ratio of the transmittance at 805 nm exiting VIS/NIR shutter $10_3$ during the second subframe (bright state) divided by the transmittance at 805 nm of light exiting VIS/NIR shutter $10_3$ during the first subframe (dark state). Because the contrast ratio at 805 nm is primarily determined by the dark state in which both TN devices $14_{3A}$ and $14_{3B}$ compensate in the first subframe, modulator $14_3$ has optical characteristics similar to those of a negative C retarder film. This makes it difficult to simultaneously widen the range of high-contrast viewing angles in both the VIS and NIR wavelength regions because modulator $14_3$ has opposite optical characteristics in these two regions. For example, adding an external negative C retarder film would improve the viewing angles through compensation in the VIS wavelength region in which modulator $14_3$ exhibits positive C character, but would worsen the viewing angle angular behavior in the NIR wavelength region in which modulator $14_3$ already exhibits negative C character.

Figure 17:
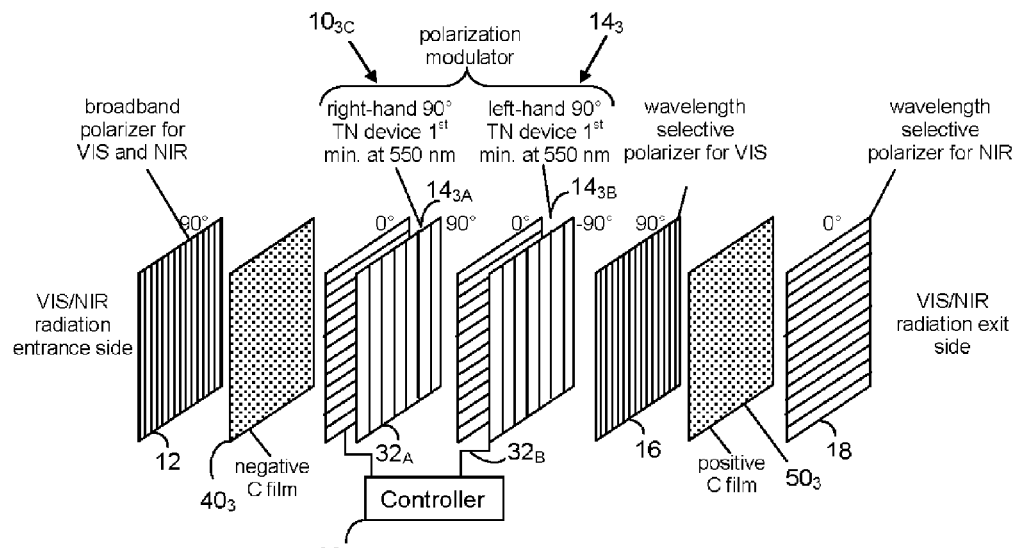
FIG. 17 is a diagram of the optical components of a viewing angle-compensated version of the VIS/NIR shutter of FIG. 14.
Figure 18A:
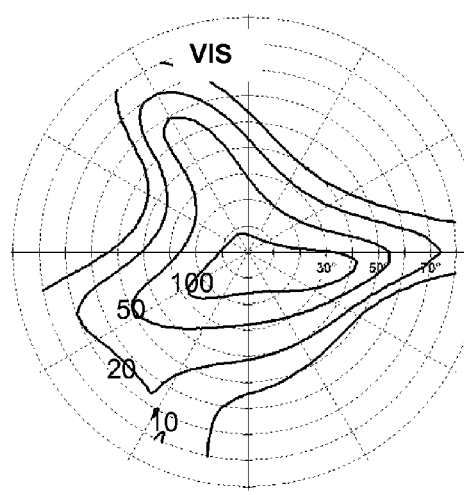
FIGS. 18A and 18B show simulated iso-contrast diagrams of the VIS/NIR shutter of FIG. 17 for, respectively, VIS radiation and NIR radiation at 805 nm.
Figure 18B:
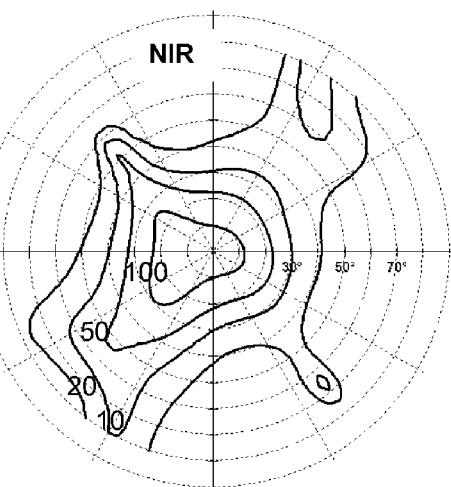

Because VIS wavelength selective polarizer 16 and wavelength selective NIR polarizer 18 are separate films that control non-overlapping parts of the electromagnetic spectrum, it is possible to independently change the angular properties of modulator $14_3$ in the separate spectral regions by providing different retarder film compensators or combinations of retarder film compensators in front of a first wavelength selective polarizer and between a first wavelength selective polarizer and a second wavelength selective polarizer. A VIS/NIR shutter $10_{3C}$ shown in FIG. 17 is an example of an optical shutter in which such a viewing angle compensation technique is applied to modulator $14_3$. VIS/NIR shutter $14_{3C}$ constitutes a modification of VIS/NIR shutter $10_3$ of FIG. 14 in that, in VIS/NIR shutter $10_{3C}$, there is placement of a negative C retarder film $40_3$ at the entrance side of polarization modulator $14_3$ (between broadband polarizer 12 and first TN device $14_{3A}$) and a positive C retarder film $50_3$ between wavelength selective VIS polarizer 16 and wavelength selective NIR polarizer 18. In a first step, the value of negative C retarder film $40_3$ is chosen to optimize the viewing angle in the VIS wavelength region. This optimum is unaffected by the value of positive C retarder film $50_3$ because it is located downstream of wavelength selective VIS polarizer 16. In a second step, the value of positive C retarder film $50_3$ is chosen to optimize the viewing angle in the NIR wavelength region. Negative C retarder film $40_3$ also affects the viewing angle in the NIR wavelength region, so this is the reason why the viewing angle in the VIS wavelength region is first optimized. Simulations indicate that a 300 nm negative C retarder film $40_3$ and a 450 nm positive C retarder film $50_3$ simultaneously optimize the viewing angles in both the VIS and NIR wavelength regions. FIGS. 18A and 18B show the remarkable improvement in viewing angles compared with those of viewing angle uncompensated cases of FIGS. 16A and 16B.

A general rule can be stated for independently optimizing the angular properties an optical shutter operating in two non-overlapping wavelength regions. A first optical retarder in the optical series is optimized for a first wavelength region in a first step; and then a second optical retarder in the optical series is optimized for a second, non-overlapping wavelength region in a second step. The first optical retarder is located in front of a first wavelength selective polarizer covering a first wavelength region, and the second optical retarder is located between the first wavelength selective polarizer and a downstream positioned second wavelength selective polarizer covering a second, non-overlapping wavelength region.

Figure 19:
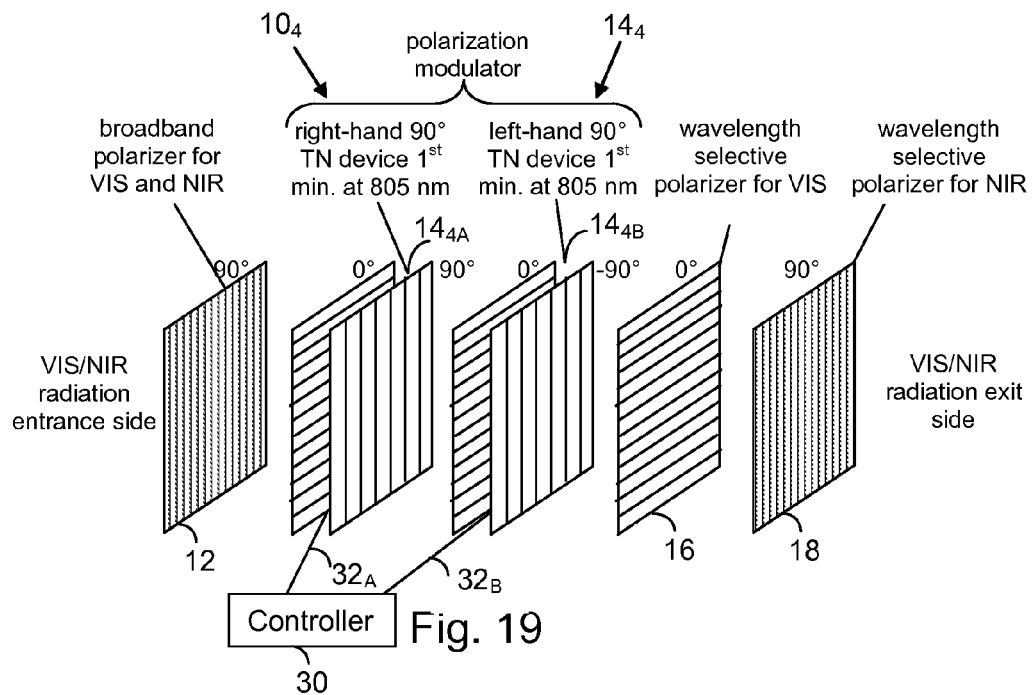
FIG. 19 is a diagram of the optical components of a VIS/NIR shutter in which a polarization modulator includes two TN liquid crystal devices each of which is tuned to an 805 nm design wavelength.
Figure 20:
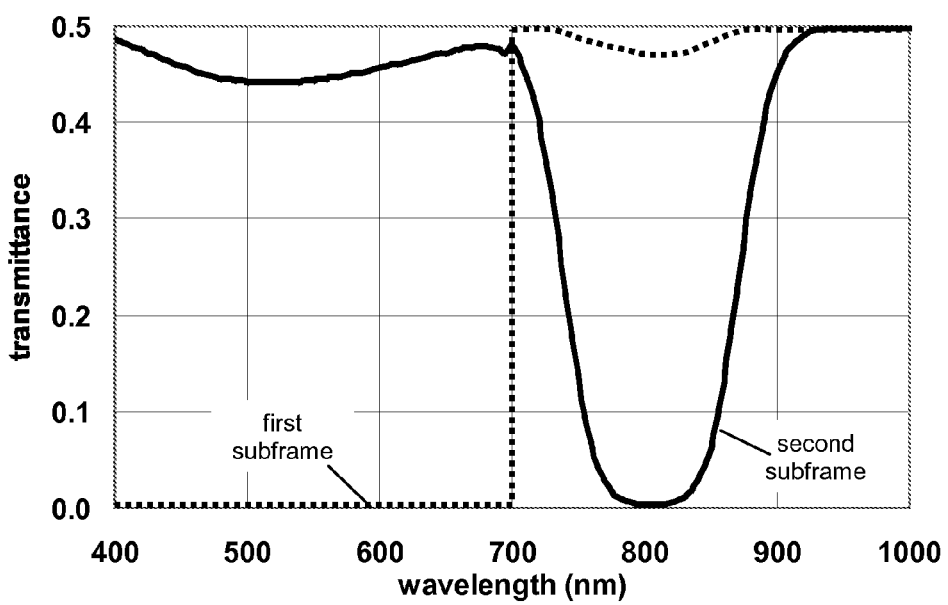
FIG. 20 shows simulated optical transmission spectra of the VIS/NIR shutter of FIG. 19.

FIG. 19 is a diagram of the optical components of a VIS/NIR shutter $10_4$, in which a polarization modular $14_4$ comprises two TN devices $14_{4A}$ and $14_{4B}$ VIS/NIR shutter $10_4$ differs from VIS/NIR shutter $10_2$ in the following two respects. For polarization modulator $14_4$, a cell gap of 3.10 μm is chosen to shift the first minimum condition to 805 nm, the peak absorption wavelength of wavelength selective NIR polarizer 18. Wavelength selective VIS polarizer 16 and wavelength selective NIR polarizer 18 have been rotated by 90° from the polarization axis orientation shown for VIS/NIR shutter $10_3$ in FIG. 14. During the first subframe, when TN devices $14_{4A}$ and $14_{4B}$ compensate, the transmission axes of broadband polarizer 12 and wavelength selective VIS polarizer 16 are perpendicular to each other. There is total extinction of VIS light and maximum transmittance of NIR radiation because the transmission axes of broadband polarizer 12 and wavelength selective NIR polarizer 18 are parallel to each other. The transmission curve for this case is shown by the dotted curve in FIG. 20. For unpolarized incident light, the transmittance is 0% over the visible spectrum, and the transmittance at 805 nm is 47.4%. During a second subframe, when controller 30 applies a 12 V signal $32_A$ to set first TN device $14_{4A}$ to its ON state, and controller 30 applies a 0 V signal $32_B$ to set second TN device $14_{4B}$ to its OFF state, the linearly polarized radiation at 805 nm leaving polarization modulator $14_4$ is rotated by 90° from the input polarization direction. Maximum absorption occurs at wavelength selective NIR polarizer 18 because its transmission axis is oriented 90° relative to the linear polarization direction of radiation entering its input side, resulting in a NIR radiation transmission of 0.336%. The transmission curve for this case is shown by the solid curve in FIG. 20. In the VIS wavelength region of the spectrum, the light exiting polarization modulator $14_3$ is no longer linearly polarized light rotated by 90°, but rather is elliptically polarized light that becomes partly absorbed by wavelength selective VIS polarizer 16, reducing the transmitted luminance to 44.9%. The luminous contrast in the VIS wavelength region is, therefore, theoretically infinite, and the contrast at 805 nm is 140.9.

The performance of VIS/NIR shutters $10_3$ and $10_4$, in which TN devices $14_{3A}$ and $14_{3B}$ and TN devices $14_{4A}$ and $14_{4B}$ are tuned for 550 nm and 805 nm, respectively, is demonstrated in the Table 2 below, where the brightness and contrast ratios in the VIS and NIR wavelength regions can be readily compared.

TABLE 2

| first minimum wavelength | 550 nm | 805 nm |
|---|---|---|
| cell gap | 2.12 µm | 3.10 µm |
| Δn of LC | 0.225 | 0.225 |
| luminance in VIS bright* | 50.0% | 44.9% |
| luminance in VIS dark* | 0.402% | 0.0% |
| contrast in VIS | 124.4 | ∞ |
| transmission at 805 nm bright* | 39.1% | 47.4% |
| transmission at 805 nm dark* | 0.336% | 0.336% |
| contrast at 805 nm | 116.3 | 140.9 |

*for unpolarized input light

The viewing angle properties of the contrast ratio of VIS/NIR shutter $10_4$ of FIG. 19 will be described where the birefringence, Δn, of the liquid crystal material and the cell gap, d, of TN devices $14_{4A}$ and $14_{4B}$ are chosen such that they operate in the so-called first minimum mode at the design wavelength of 805 nm. The dependence of contrast ratio on the angle of incident radiation is illustrated by the iso-contrast diagrams for VIS light in FIG. 21A and for NIR radiation at 805 nm in FIG. 21B.

Figure 23A:
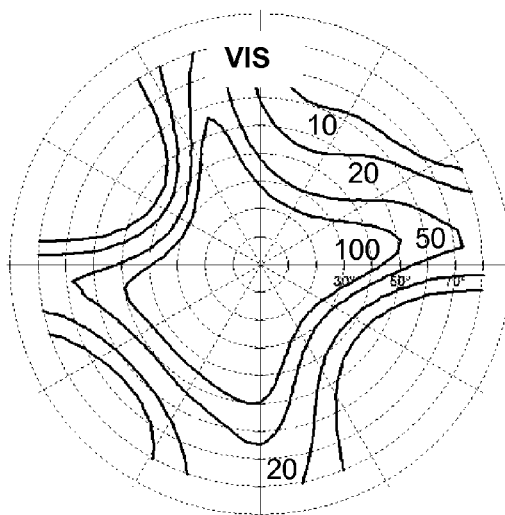
FIGS. 23A and 23B show simulated iso-contrast diagrams of the VIS/NIR shutter of FIG. 22 for, respectively, VIS radiation and NIR radiation at 805 nm.
Figure 23B:
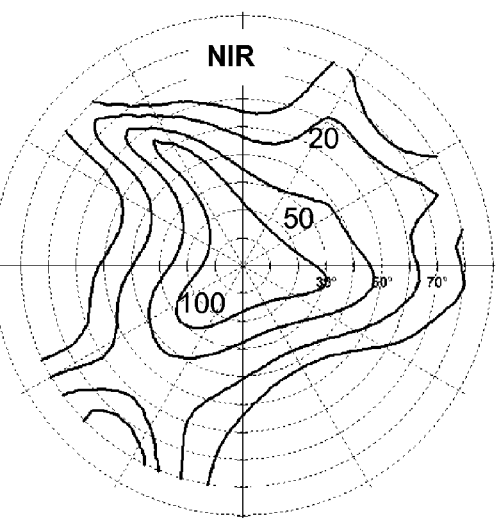

As with VIS/NIR shutter $10_3$, the range of viewing angles in the VIS wavelength region of the spectrum and the NIR wavelength region of the spectrum can be independently optimized by providing optical retarder films at strategic locations in the optical path of VIS/NIR shutter $10_4$. A VIS/NIR shutter $10_{4C}$ shown in FIG. 22 is an example of an optical shutter in which the range of viewing angles is optimized. The range of viewing angles is optimized in the VIS wavelength region in a first step by introducing a 100 nm negative C retarder film $40_4$ at the entrance of polarization modulator $14_4$ (between broadband polarizer 12 and first TN device $14_{4A}$), and the range of viewing angles in the NIR wavelength region of the spectrum is optimized in a second step by introducing a 350 nm +C retarder film $50_4$ between wavelength selective VIS polarizer 16 and wavelength selective NIR polarizer 18. The resulting iso-contrast diagrams are shown for VIS light in FIG. 23A and for NIR radiation at 805 nm in FIG. 23B. Comparison of the diagrams of FIGS. 23A and 23B with the uncompensated iso-contrast diagrams of FIGS. 21A and 21B reveals that the range of high-contrast viewing angles is enlarged, especially in the NIR wavelength region.

Skilled persons will recognize that exchanging the positions of wavelength selective VIS polarizer 16 and NIR polarizer 18 with any associated optical retarder films in these embodiments would produce the similar results, as would exchanging the positions of the pair of wavelength selective VIS polarizer 16 and NIR polarizer 18 with the position of broadband polarizer 12.

Second Embodiment

A second VIS/NIR shutter embodiment 60 is illustrated in FIGS. 24A and 24B. VIS/NIR shutter 60 operates using the guest-host effect, in which dichroic dye guest molecules are dissolved in a liquid crystal host mixture and orient themselves with their long axes along the director of the host liquid crystal material. Dichroic dyes absorb radiation anisotropically and thereby cause the guest-host mixture to exhibit variable absorption depending upon the orientation of the liquid crystal director relative to the direction of the electric field vector of incident linearly polarized radiation. There are two different types of guest-host systems: positive guest-host systems, which show maximum absorption for incident radiation polarized along the liquid crystal director and minimum absorption for radiation polarized perpendicular to the liquid crystal director; and negative guest-host systems, which show minimum absorption for incident radiation polarized along the liquid crystal director and maximum absorption for radiation polarized perpendicular to the liquid crystal director. Positive guest-host systems comprise positive dichroic dyes, in which the transition moment of the dye generally lies in a direction parallel to the long axis of the dye molecule. Negative guest-host systems comprise negative dichroic dyes, in which the transition moment of the dye generally lies in a direction perpendicular to the long axis of the dye molecule.

A guest-host system can be both positive and negative when the host mixture comprises both positive and negative dyes. FIGS. 24A and 24B are diagrams of, respectively, a negative dye absorbing and positive dye non-absorbing state and a negative dye non-absorbing and positive dye absorbing state of guest-host system 60 comprising broadband linear polarizer 12 and a liquid crystal cell or device 62 fabricated with both positive and negative dyes.

In FIG. 24A, the director n of the host liquid crystal material is oriented in a direction perpendicular to cell electrodes $66_i$ and $66_e$. This perpendicular orientation would be the case either for a vertically aligned nematic (VAN) device having homeotropic alignment and a liquid crystal host characterized by negative dielectric anisotropy and receiving zero applied voltage or below threshold applied voltage or, alternatively, for a homogeneously aligned liquid crystal device having a liquid crystal host characterized by positive dielectric anisotropy and receiving an applied voltage several times above threshold voltage. The positive dyes are indicated in FIG. 24A by elongated cigar-shaped molecules, with their long axes oriented in a direction parallel to the liquid crystal director n.

In this embodiment, broadband polarizer 12 for the VIS/NIR region is placed at the radiation input side of guest-host system 60. The input polarized radiation in a first absorption wavelength band characteristic of the positive dye is therefore weakly absorbed. The negative dyes are indicated in FIG. 24A by disk-shaped molecules, with their normal axes also parallel the liquid crystal director n. The input polarized radiation in a second absorption wavelength band characteristic of the negative dye is therefore strongly absorbed.

In FIG. 24B, the director of the host liquid crystal material has been rotated by 90°, but remains in the plane of the drawing. For a VAN liquid crystal cell 62, the 90° rotation of the liquid crystal director would correspond to the case in which a voltage that is several times the threshold voltage is applied to the electrodes. For an electrically controlled birefringence (ECB) liquid crystal cell 62, the 90° rotation of the liquid crystal director would correspond to the case in which either a zero voltage or a voltage below the threshold voltage is applied. In FIG. 24B, light in the first wavelength band, characteristic of the positive dye, is strongly absorbed, whereas light in the second wavelength band, characteristic of the negative dye, is weakly absorbed.

Thus, application and removal of a voltage that is several times the threshold voltage from the liquid crystal device 62 of FIG. 24A and 24B can switch between non-absorbing and absorbing states in a first wavelength band and absorbing and non-absorbing states in a second wavelength band. For example, the positive dye could be a single dye or dye mixture having a first absorption wavelength band covering a part or all of the NIR wavelength region of the spectrum, such as the transition metal dithiolene dyes described by Marshall in *Molecular Crystals and Liquid Crystals*, Volume 454, pages 47-79 (2006). The negative dye could be a single dye or a mixture of three or more negative dyes having a second absorption wavelength band covering the entire VIS wavelength region of the spectrum, as described, for example, by V. Chigrinov, et. al in the *Japanese Journal of Applied Physics*, Part 1, Volume 42, Number 3, pages 1297-1300 (2003). Alternatively, the positive dye mixture could have an absorption wavelength band covering the entire VIS wavelength region, and the negative dye could be a negative dye or dye mixture covering part or all of the NIR wavelength region.

Skilled persons will recognize that moving the position of broadband polarizer 12 from the front of guest-host device 62 to the back of guest-host device 62 would produce the same result.

All of the variations of this second embodiment described above result in transmission spectra of the desired type shown in FIGS. 1A and 1B.

Third Embodiment

A third VIS/NIR shutter embodiment 70 is illustrated in FIGS. 25A and 25B. A liquid crystal cell 72 of VIS/NIR shutter 70 is a guest-host device comprising a 270° twisted nematic liquid crystal structure, similar to that of an STN device, which has dissolved, positive dichroic dye molecules that absorb radiation in the NIR wavelength region. Liquid crystal cell 72 is positioned between an input polarizer $74_i$ and an exit polarizer $74_e$ that each linearly polarize radiation in the VIS wavelength region of the spectrum but have no effect in the NIR wavelength region of the spectrum. The transmission axes of polarizers $74_i$ and $74_e$ are orthogonally aligned. In FIG. 25A, the transmission axes of polarizers $74_i$ and $74_e$ are set at 90° angles relative to the alignment directions on the adjacent input surface of an electrode $76_i$ and the adjacent output surface of an electrode $76_e$ of 270° twisted nematic liquid crystal cell 72. This results in the so-called o-mode of operation in visible light, which gives a wide viewing angle.

VIS/NIR shutter 70 operates as follows. With respect to operation in the VIS wavelength region of the electromagnetic spectrum, at zero applied voltage, the nematic director, indicated by the fine straight lines in FIG. 25A, twists 270° along a straight line path from one of electrodes $76_i$ and $76_e$ to the other. The 270° twisted nematic liquid crystal structure acts as a 270° linear polarization rotator would act if its cell gap, d, satisfies the following equation $$d = \frac{\sqrt{7}}{2} \frac{\lambda}{\Delta n}, \quad [1]$$

where λ is the design wavelength, typically 550 nm, and Δn is the birefringence of the nematic liquid crystal mixture. At the design wavelength, horizontally polarized radiation incident on the entrance surface of electrode $76_i$ exits liquid crystal cell 72 as vertically polarized visible radiation and thereafter passes unhindered through exit polarizer $74_e$. Ignoring light reflections and assuming ideal polarizers $74_i$ and $74_e$, the visible light transmission is 50% for unpolarized light at the design wavelength. At an applied voltage, V, that is many times the threshold voltage, the nematic structure can be approximated by a vertically aligned nematic director structure, as shown in FIG. 25B. In this configuration, the nematic liquid crystal material has no effect on the polarization state of visible radiation passing through it, and linearly polarized visible light propagating from input polarizer $74_i$ is blocked by polarizer $74_e$, resulting in 0% visible light transmission.

The operation of 270° twisted nematic cell 72 in the visible spectrum is very similar to that of a conventional 90° twisted nematic cell.

With respect to operation in the NIR wavelength region of the electromagnetic spectrum, the dark cigar-shaped molecules in FIG. 25A represent dissolved positive, dichroic NIR wavelength absorbing dye molecules whose long axes follow the 270° twisted structure. Skilled persons will recognize that the optical eigenmodes in such a 270° twisted structure can be quite elliptically polarized or nearly circularly polarized. This phenomenon is described at length by T. Scheffer and J. Nehring in a chapter devoted to guest-host displays in *The Physics and Chemistry of Liquid Crystal Devices*, G. Sprokel Ed., Plenum Press, N.Y., pages 173-198 (1979). In the NIR region wavelength of the spectrum, the radiation entering liquid crystal cell 72 is unpolarized and can be considered to be resolved into two orthogonal, elliptically unpolarized eigenmodes that both are strongly absorbed by the dissolved NIR dye. This results in low transmittance for zero applied voltage.

At an applied voltage, V, that is many times the threshold voltage, the nematic structure may be approximated by a vertically aligned nematic director structure as shown in FIG. 25B, in which the positive, dichroic NIR absorbing dyes are vertically oriented along with the liquid crystal director. In this orientation, the transition moment of the dye is perpendicular to the E-field of the incoming unpolarized NIR radiation and very little absorption occurs, resulting in high radiation transmission.

The transmission spectrum of VIS/NIR shutter 70 was simulated using the LCD simulation software DIMOS, available from Autronic-Melchers GmBH, Karlsruhe, Germany. The nematic liquid crystal material used in the simulation was the nematic mixture MLC-7030 available from Merck, Darmstadt, Germany. The wavelength dispersion of the birefringence of MLC-7030 was included in the simulations. The birefringence at the design wavelength of 550 nm was 0.1126. The cell gap was chosen according to equation [1] to be 6.46 μm. The simulations assumed a broadband NIR absorber 12 having a constant extraordinary absorption coefficient of 0.09 $nm^{-1}$ and a constant ordinary absorption coefficient of 0.009 $nm^{-1}$, for a dichroic ratio of 10. For wavelengths shorter than 780 nm, the visible range, both the ordinary and extraordinary absorption coefficients were set to zero.

Figure 26:
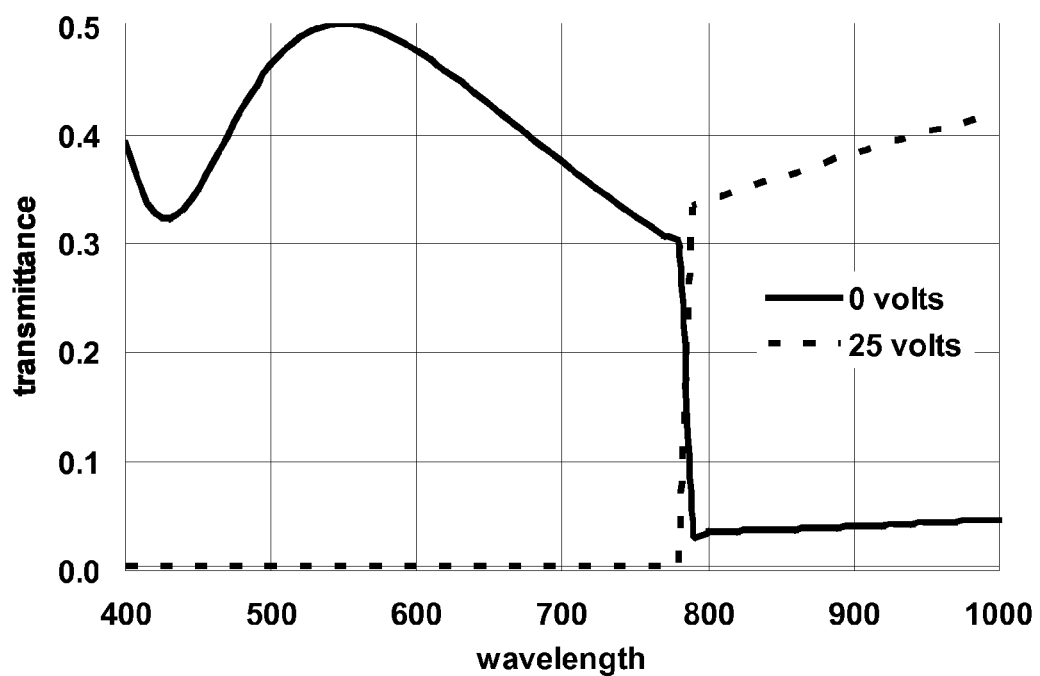
FIG. 26 shows simulated optical transmission spectra of the VIS/NIR shutter of FIGS. 25A and 25B.

FIG. 26 shows a simulation of the transmission spectrum of this device for the two switched states. For the VIS wavelength region at zero applied voltage, the transmission of radiation achieves a maximum of 50% at the 550 nm design wavelength. When 25 volts are applied to liquid crystal cell 72, the transmission of radiation drops close to zero, resulting in a contrast ratio in the thousands. For the NIR wavelength region, the situation is just the reverse. At an applied voltage of 25 volts, the transmission of radiation is about 35% at 850 nm, and at zero volts the transmission of radiation drops to around 3.5% at 850 nm, with a resulting contrast ratio of around 10. As with all guest-host systems, there is a trade-off between throughput and contrast ratio, which trade-off can be controlled by adjusting the dye concentration in the liquid crystal host. Decreasing the dye concentration increases the radiation throughput but decreases the contrast ratio, and increasing the dye concentration decreases the radiation throughput but increases the contrast ratio. The optimum dye concentration for the device will depend on the specific requirements of the particular application.

Skilled persons will appreciate that there is a variation of the third embodiment in which the polarizers operate in the NIR wavelength region and are transparent in the VIS wavelength region and in which the positive dichroic dye dissolved in the liquid crystal material absorbs radiation in the VIS wavelength region but is nonabsorbing in the NIR wavelength region. Polarizers $74_i$ and $74_e$ could be of the NIR absorbing type referred to in the first embodiment of this disclosure, and the VIS absorbing positive dichroic dye could be a mixture of dichroic dyes with overlapping absorption bands in the VIS region of the type referred to in the second embodiment of this disclosure.

It will be obvious to those having skill in the art that many changes may be made to the details of the above-described embodiments without departing from the underlying principles of the invention. The scope of the present invention should, therefore, be determined only by the following claims.

The invention claimed is:

1. An optical shutter that is rapidly switchable between optical states to alternately transmit visible radiation and near infrared radiation, comprising:
   a broadband wavelength selective polarizing filter constructed to impart a polarization state to incident radiation and transmit polarized radiation within at least the visible wavelength region and the near infrared region of the electromagnetic spectrum;
   a wavelength selective polarizing filter pair including, in optical series arrangement, a wavelength selective polarizing filter transmitting polarized radiation within the visible wavelength region and a wavelength selective polarizing filter transmitting polarized radiation within the near infrared wavelength region; and
   a liquid crystal polarization modulator positioned to receive incident radiation for internal propagation through the liquid crystal polarization modulator, positioned between the broadband wavelength selective polarizing filter and the wavelength selective polarizing filter pair, and responsive to a first value and a second value of an applied control signal to switch the internally propagating radiation to, respectively, a first polarization state and a second polarization state to produce, in cooperation with the broadband wavelength selective polarizing filter and the wavelength selective polarizing filter pair, optical shutter output radiation in different wavelength regions of the electromagnetic spectrum, the switching of the internally propagating radiation to the first polarization state causing transmission and blockage of the optical shutter output radiation within, respectively, the visible wavelength region and the near infrared region, and the switching of the internally propagating radiation to the second polarization state causing transmission and blockage of the optical shutter output radiation within, respectively, the near infrared wavelength region and the visible wavelength region.

2. The optical shutter of claim 1, further comprising for viewing angle compensation an optical retarder positioned between the wavelength selective polarizing filters included in the wavelength selective polarizing filter pair transmitting polarized radiation within the visible and near infrared wavelength regions.

3. The optical shutter of claim 2, in which the liquid crystal polarization modulator includes a twisted nematic liquid crystal device and the optical retarder includes a negative C retarder film.

4. The optical shutter of claim 2, in which the liquid crystal polarization modulator includes a liquid crystal device tuned to a design wavelength in the visible wavelength region, and in which the wavelength selective polarizing filter transmitting polarized radiation within the visible wavelength region is positioned between the liquid crystal device and the optical retarder.

5. The optical shutter of claim 2, in which the liquid crystal polarization modulator includes a liquid crystal device tuned to a design wavelength in the near infrared wavelength region, and in which the wavelength selective polarizing filter transmitting polarized radiation within the near infrared wavelength region is positioned between the liquid crystal device and the optical retarder.

6. The optical shutter of claim 1, in which the liquid crystal polarization modulator includes first and second liquid crystal devices positioned nearer to, respectively, the broadband wavelength selective polarizing filter and the wavelength selective polarizing filter pair, and further comprising first and second optical retarders for viewing angle compensation, the first optical retarder positioned between the broadband wavelength selective polarizing filter and the first liquid crystal device, and the second optical retarder positioned between the wavelength selective polarizing filters included in the wavelength selective polarizing filter pair transmitting polarized radiation within the visible and near infrared wavelength regions.

7. The optical shutter of claim 6, in which the first optical retarder includes a negative C retarder film and the second optical retarder includes a positive C retarder film.

8. An optical shutter that is rapidly switchable between optical states to alternately transmit visible radiation and near infrared radiation, comprising:
   a liquid crystal polarization modulator positioned to receive incident radiation for internal propagation through the liquid crystal polarization modulator, the internally propagating radiation having a polarization state, and the liquid crystal polarization modulator comprising a guest-host liquid crystal mixture that includes a liquid crystal director contained between first and second electrodes and that exhibits variable absorption of different radiation wavelength regions, depending on the orientation of the liquid crystal director relative to the polarization state of the internally propagating radiation;
   a first wavelength selective polarizing filter imparting a polarization state to incident radiation within the visible wavelength region but not imparting a polarization state to incident radiation within the near infrared wavelength region of the electromagnetic spectrum;
   a second wavelength selective polarizing filter imparting a polarization state to incident radiation within the visible wavelength region but not imparting a polarization state to incident radiation within the near infrared wavelength region of the electromagnetic spectrum, the first and second wavelength selective polarizing filters positioned adjacent different ones of the first and second electrodes of the liquid crystal polarization modulator; and
   the liquid crystal polarization modulator responsive to a first value and a second value of an applied control signal to switch the internally propagating radiation to, respectively, a first polarization state and a second polarization state to selectively produce, in cooperation with the first and second wavelength selective polarizing filters, optical shutter output radiation in the visible wavelength region and the near infrared wavelength region, the switching of the internally propagating radiation in the first polarization state causing transmission and blockage of the optical shutter output radiation within, respectively, the visible wavelength region and the near infrared region, and the switching of the internally propagating radiation to the second polarization state causing transmission and blockage of the optical shutter output radiation within, respectively, the near infrared wavelength region and the visible wavelength region.

9. The optical shutter of claim 8, in which the guest-host liquid crystal mixture that includes a liquid crystal director between the first and second electrodes comprises a twisted nematic liquid crystal structure of a twisted nematic liquid crystal cell.

10. The optical shutter of claim 9, in which the twisted nematic liquid crystal cell has a 270° twisted nematic liquid crystal structure.

* * * * *